US007565028B2

(12) United States Patent
Saed

(10) Patent No.: US 7,565,028 B2
(45) Date of Patent: Jul. 21, 2009

(54) DIGITAL COMPOSITION OF A MOSAIC IMAGE

(76) Inventor: Aryan Saed, #812-265 Poulin Ave., Ottawa, Ontario (CA) K2B 7Y8

( * ) Notice: Subject to any disclaimer, the term of this patent is extended or adjusted under 35 U.S.C. 154(b) by 789 days.

(21) Appl. No.: 10/951,638

(22) Filed: Sep. 29, 2004

(65) Prior Publication Data

US 2005/0147322 A1 Jul. 7, 2005

(30) Foreign Application Priority Data

Oct. 1, 2003 (CA) ................................ 2442603

(51) Int. Cl.
*G06K 9/36* (2006.01)
*G06K 9/40* (2006.01)
*G06K 9/32* (2006.01)
*G09G 5/00* (2006.01)

(52) U.S. Cl. ................. 382/284; 382/274; 382/282; 382/298; 345/629

(58) Field of Classification Search .............. 382/284
See application file for complete search history.

(56) References Cited

U.S. PATENT DOCUMENTS 5,649,032 A * 7/1997 Burt et al. .................... 382/284
6,137,498 A 10/2000 Silvers
6,532,312 B1 3/2003 Corkran
6,549,679 B1 4/2003 Zheng
6,665,451 B1 * 12/2003 Kusama et al. .............. 382/282
6,895,127 B1 * 5/2005 Zheng ........................ 382/294
2003/0001858 A1 1/2003 Jack
2005/0100319 A1 * 5/2005 Saed ............................ 386/69

OTHER PUBLICATIONS

Klein et al., "Video Mosaics", NPAR 2002, Second International Symposium on Non Photorealistic Rendering, Jun. 2002, pp. 21-28.*

* cited by examiner

*Primary Examiner*—Brian P Werner
*Assistant Examiner*—Jose M Torres

(57) ABSTRACT

A mosaic image resembling a target image is composed of images from a data base. The target image is divided into regions of a specified size and shape, and the individual images from the data base are compared to each region to find the best matching tile. The comparison is performed by calculating a figure of visual difference between each tile and each region. The data base of tile images is created from raw source images using digital image processing, whereby multiple instances of each individual raw source image are produced. The tile images are organized by subject matter, and tile matching is performed such that all required subject matters are represented in the final mosaic. The digital image processing involves the adjustment of colour, brightness and contrast of tile images, as well as cropping. An image description index locates each image in the final mosaic.

29 Claims, 14 Drawing Sheets

$$D = \begin{pmatrix} 0.20 & 0.01 & 0.04 & 0.04 & 0.20 \\ 0.85 & 0.66 & 0.69 & 0.61 & 0.45 \\ 0.74 & 0.55 & 0.58 & 0.50 & 0.34 \\ 0.44 & 0.25 & 0.28 & 0.20 & 0.04 \\ 0.41 & 0.22 & 0.25 & 0.17 & 0.01 \\ 0.40 & 0.21 & 0.24 & 0.16 & 0.00 \\ 0.18 & 0.01 & 0.02 & 0.06 & 0.22 \\ 0.67 & 0.48 & 0.51 & 0.43 & 0.27 \\ 0.82 & 0.63 & 0.66 & 0.58 & 0.42 \\ 0.78 & 0.59 & 0.62 & 0.54 & 0.38 \end{pmatrix}$$

$$D_s' = \begin{pmatrix} 0.18 & 0.01 & 0.02 & 0.04 & 0.00 \\ 0.20 & 0.01 & 0.04 & 0.06 & 0.01 \\ 0.40 & 0.21 & 0.24 & 0.16 & 0.04 \\ 0.41 & 0.22 & 0.25 & 0.17 & 0.20 \\ 0.44 & 0.25 & 0.28 & 0.20 & 0.22 \\ 0.67 & 0.48 & 0.51 & 0.43 & 0.27 \\ 0.74 & 0.55 & 0.58 & 0.50 & 0.34 \\ 0.78 & 0.59 & 0.62 & 0.54 & 0.38 \\ 0.82 & 0.63 & 0.66 & 0.58 & 0.42 \\ 0.85 & 0.66 & 0.69 & 0.61 & 0.45 \end{pmatrix} \quad D_x' = \begin{pmatrix} 7 & 7 & 7 & 1 & 6 \\ 1 & 1 & 1 & 7 & 5 \\ 6 & 6 & 6 & 6 & 4 \\ 5 & 5 & 5 & 5 & 1 \\ 4 & 4 & 4 & 4 & 7 \\ 8 & 8 & 8 & 8 & 8 \\ 3 & 3 & 3 & 3 & 3 \\ 10 & 10 & 10 & 10 & 10 \\ 9 & 9 & 9 & 9 & 9 \\ 2 & 2 & 2 & 2 & 2 \end{pmatrix}$$

Fig. 11

$$D_s = \begin{pmatrix} 0.18 & 0.01 & 0.02 & 0.04 & 0.00 \\ 0.20 & 0.01 & 0.04 & 0.06 & 0.01 \\ 0.40 & 0.21 & 0.24 & 0.16 & 0.04 \\ 0.41 & 0.22 & 0.25 & 0.17 & 0.20 \\ 0.44 & 0.25 & 0.28 & 0.20 & 0.22 \\ 0.67 & 0.48 & 0.51 & 0.43 & 0.27 \\ 0.74 & 0.55 & 0.58 & 0.50 & 0.34 \\ 0.78 & 0.59 & 0.62 & 0.54 & 0.38 \\ 0.82 & 0.63 & 0.66 & 0.58 & 0.42 \\ 0.85 & 0.66 & 0.69 & 0.61 & 0.45 \end{pmatrix} \qquad D_x = \begin{pmatrix} 7 & 7 & 7 & 1 & 6 \\ 1 & 1 & 1 & 7 & 5 \\ 6 & 6 & 6 & 6 & 4 \\ 5 & 5 & 5 & 5 & 1 \\ 4 & 4 & 4 & 4 & 7 \\ 8 & 8 & 8 & 8 & 8 \\ 3 & 3 & 3 & 3 & 3 \\ 10 & 10 & 10 & 10 & 10 \\ 9 & 9 & 9 & 9 & 9 \\ 2 & 2 & 2 & 2 & 2 \end{pmatrix}$$

$$\tilde{D}_s = \begin{pmatrix} 0.18 & 0.01 & 0.02 \\ 0.41 & 0.22 & 0.25 \\ 0.44 & 0.25 & 0.28 \end{pmatrix} \qquad \tilde{D}_x = \begin{pmatrix} 7 & 7 & 7 \\ 5 & 5 & 5 \\ 4 & 4 & 4 \end{pmatrix}$$

Fig. 13

$$D_s = \begin{pmatrix} \cancel{0.18} & \cancel{0.01} & \cancel{0.02} & \cancel{0.04} & \cancel{0.00} \\ \cancel{0.20} & \cancel{0.01} & \cancel{0.04} & \cancel{0.06} & \cancel{0.01} \\ \cancel{0.40} & \cancel{0.21} & \cancel{0.24} & \cancel{0.16} & \cancel{0.04} \\ \cancel{0.41} & \cancel{0.22} & \cancel{0.25} & \cancel{0.17} & \cancel{0.20} \\ \cancel{0.44} & \cancel{0.25} & \cancel{0.28} & \cancel{0.20} & \cancel{0.22} \\ 0.67 & 0.48 & 0.51 & 0.43 & 0.27 \\ 0.74 & 0.55 & 0.58 & 0.50 & 0.34 \\ 0.78 & 0.59 & 0.62 & 0.54 & 0.38 \\ 0.82 & 0.63 & 0.66 & 0.58 & 0.42 \\ 0.85 & 0.66 & 0.69 & 0.61 & 0.45 \end{pmatrix} \quad D_x = \begin{pmatrix} \cancel{7} & \cancel{7} & \cancel{7} & \cancel{1} & \cancel{6} \\ \cancel{1} & \cancel{1} & \cancel{1} & \cancel{7} & \cancel{5} \\ \cancel{6} & \cancel{6} & \cancel{6} & \cancel{6} & \cancel{4} \\ \cancel{5} & \cancel{5} & \cancel{5} & \cancel{5} & \cancel{1} \\ \cancel{4} & \cancel{4} & \cancel{4} & \cancel{4} & \cancel{7} \\ 8 & 8 & 8 & 8 & 8 \\ 3 & 3 & 3 & 3 & 3 \\ 10 & 10 & 10 & 10 & 10 \\ 9 & 9 & 9 & 9 & 9 \\ 2 & 2 & 2 & 2 & 2 \end{pmatrix}$$

Fig. 14

DIGITAL COMPOSITION OF A MOSAIC IMAGE

FIELD OF INVENTION

The present invention relates generally to the computerized composition of images from a plurality of source images. More specifically, the composed image resembles a target image, whereby the target image and the source images are photographic images or frames from motion video. The composition of an image from a plurality of other images is a well known method to create artistically pleasing effects.

BACKGROUND

Discussion of Prior Art

Mosaic images are increasingly popular in the field of graphic design and graphic art. Whereas traditionally mosaic images were manually composed by artists, such collages are now generally composed using digital search and matching techniques with specialised computer software. With such software it is possible to create mosaics containing hundreds and even thousands of images by automatically placing images from thousands of raw source images in a digital image library. These library images are typically digital still pictures (photographs) or digital snapshots from motion video.

The art of manual composition of a mosaic image precedes the art of digital composition. In either case, manual or computerized, the artist composes a collage of images that, when seen from a distance, resembles a different image. That different image, the target image, is often a portrait of a person. The more source images are available to the artist, the more choice the artist has to find a suitable match for a region in order to achieve optimum visual effect.

U.S. Pat. No. 6,137,498 to Silvers (Oct. 24, 2000) describes a computerized method to compare regions of a digital target image with digital images from a data base. Specifically the method describes how for each tile of a target image, the best matching image in a specified data base of source images is found.

A limitation of the method described in the Silvers patent lies in the required number of source images. To obtain an optically and artistically pleasing end result, a data base containing thousands or ten thousands of individual images is required. A large data base is desirable since it would ensure to some degree that images covering a broad visual range are provided. A broad visual range would entail, for instance, images ranging from very dark to very light, and images ranging from having a dark area against a light background to images having a light area against a dark background. Image data bases containing large number of images are available publicly, and the larger the data base, the better the final outcome. It is beneficial to invent a method for composing pleasing mosaic images from smaller data bases. Smaller sized private data bases consist for instance of private photographs, and using the prior art, such a data base may yield a less than pleasing mosaic due to the limitations imposed by the size of the data base and the resulting limited visual range of the source images. For instance, the smaller data base may not contain sufficient dark images, or dark images with lighter areas. As a result, an image that is considered the best match for a particular region in the mosaic in comparison to all other images, may actually turn out not to produce a visually pleasing match. It is then merely the best option, but still not good enough.

A second limitation lies in the matching method. The prior art method is tailored for large image data bases. For each tile of the target image, the described matching method finds the best source image in the data base. Hence, the method cannot guarantee the insertion of specific or all source images of the data base. Not only is this a result of the matching method itself, it is also a side effect of the underlying desire to use large data bases. Clearly, if a data base contains thousands of images, as desired, a mosaic composed of hundreds of tiles cannot possibly contain all the images in that data base. In some prior art an effort is made to guarantee the insertion of a small number of tile images (in relation to the total number of tile images in the mosaic), but not all tile images. It is hence beneficial to invent a matching method that enables the placement of select or all source images of a data base, resulting in a mosaic that better represents the images in a data base. For instance, if a mosaic is to be composed using a data base of photographs taken at a private event, and if all participants at the event were depicted in one or more photographs in the data base, it is beneficial if all participants are represented in the mosaic.

The present invention distinguishes the Silvers patent in that it uses a finite sized library of source images and ensures that each source images is included in the mosaic representation of the master or target image.

The significance of this may be best described by way of the following example. At a wedding one or more photographers, professional or amateur, takes a number of pictures of the bride and groom and all of the guests in attendance. These pictures are then digitized, if necessary, and stored as source images in an image library. One of the pictures of the bride and groom might be selected as the target or master image and a mosaic representation thereof is prepared in which each and every one of the source images is incorporated. As an alternative the mosaic representation might be composed of images of just the bride's family or just the groom's family. The important distinction over the prior art is that in the present invention a source image is selected and a place in the mosaic is found for it. In contrast, the Silvers patent selects a region in the mosaic and finds a source image from a very large library to best match the region. There is no attempt to place in the mosaic all source images in the library.

A third limitation of the prior art lies in the cropping method. The set of source images is generated from a set of raw source images by cropping each raw source image to a square or rectangle of specified size. In prior art the purpose of cropping is to produce source images of a desired shape regardless the shape of the underlying raw source image. For instance, this allows an entire data base consisting of digital photographs with a variety of aspect ratios (square, 3:4 and 9:16 rectangles) to be used for mosaic tiles of any aspect ratio. For simplicity and to enable automation, each crop is performed from centre to ensure that the centered subject matter of a tile (an object, a person etc.) appears in the crop and is not cut out.

U.S. published Patent Application 2003/0001858 A1, to Jack (Jan. 2, 2003), describes a method for creating a mosaic image whereby tile images represent single pixels of the target image. The publication further describes the enhancement of the target image itself and modification of the colour of the selected tile image for a particular tile region based on the colour of the underlying pixel in the target image. The publication further describes the automatic creation of tile images using pattern recognition techniques. Each occurrence of a pattern (e.g. a person's face) in a raw source image leads to the creation of a tile image based on the identified pattern. For instance, a photograph of two people leads to the creation of two tile images from that photograph, each tile image covering the area of the photograph in which a set pattern (a persons face) has been found. The application does not teach a new method for the selection of source images.

U.S. Pat. No. 6,549,679 to Zheng (Apr. 15, 2003), describes an alternate method for generating a mosaic (a photo montage) from a very large database. It is an objective of the invention to enable the use of an inexpensive home computer (a personal computer) for the mosaic generation, and to require no particular skill by the user or significant operator intervention. The invention results in time effective (fast) generation of the mosaic using a very large database, and this is accomplished through categorization of source images (micro images) in the data base, based on their average colour. The inventor anticipates that a data base with more than 10,000 source images will be required for a high quality resemblance of the mosaic with the target image. Similar to the method by Silvers, this invention too is a method for selecting the best source image from a very large data base for a particular tile region, and it does not teach a method for the placement of all or a substantial amount of the images in a source library of limited size.

U.S. Pat. No. 6,532,312 to Corkran (Mar. 11, 2003) describes a method for submitting images through a web interface, with the objective to collect from people around the world ideas and feelings about a particular matter (the new millennium). The images and their annotations are entered in a searchable data base. The images and annotations are judged by an editorial team during a manual review process, and included within the scope of the invention is the placement of the submitted image in a quilt. It is thereby an objective to assemble a quilt of the sum of submitted images, and to make the quilt viewable through a web interface. The invention does not teach a computer automated method that places the images in the quilt, and it does not teach a method for the selection of images from a data base for use in the generation of a mosaic.

SUMMARY OF THE INVENTION

The present invention presents a cropping method that improves the resemblance of the mosaic to the target image. Furthermore, the present invention presents a source image brightness, contrast and colour adjustment method that improves the resemblance of the mosaic to the target image. These advantages are specifically pronounced if a smaller set of source images is used, for instance source images form a source library with a few hundred source images in stead of thousands.

Furthermore, the present invention presents a new matching method that improves control over the representation of source images in the final mosaic image, particularly enabling the mandatory placement of a substantial portion of all available tile images. Furthermore, the present invention presents an indexing method that allows the creation of an index similar to that of a geographical map. The index allows a viewer of a mosaic to quickly locate one or more occurrences of a specific source image in the mosaic. These advantages are particularly beneficial if the mosaic is composed of private images from a private event.

Therefore in accordance with a first aspect of the invention there is provided a method of generating a mosaic representation of a target image, the mosaic representation incorporating a plurality of source images, comprising the steps of: loading the target image into a computer; generating a database having a library of source images; dividing the target image into multiple tile regions; selecting source images from the library; searching through the multiple tile regions to locate tile regions having a high visual similarity when compared with the selected source images; positioning the source images in the located regions; and repeating the search and positioning steps until the mosaic representation is complete.

In accordance with a second aspect there is provided a method of generating a subject matter index for a library of source images used in a mosaic representation of a master image, the source images being positioned in tile regions of the mosaic representation based on visual similarity compared with corresponding regions of the master image, the method comprising the steps of: dividing the master image into multiple tile regions; assigning a co-ordinate to the location of each tile region; providing a title for the subject matter of each source image; and preparing a list of co-ordinates for each title.

In accordance with a further aspect there is provided a method for producing multiple, visually different, versions of a source image for use in generating a mosaic representation of a master image, the mosaic representation incorporating a plurality of source images, each of the multiple versions being produced by applying one or more digital image processing schemes to the source image.

In accordance with a further aspect there is provided an article displaying a mosaic representation of a target image, the mosaic representation incorporating a plurality of source images, the mosaic representation composed by a process comprising the steps of: loading the target image into a computer; generating a database having a library of source images; dividing the target image into multiple tile regions; selecting source images from the library; searching through the multiple tile regions to locate tile regions having a high visual similarity when compared with the selected source images; positioning the source images in the located regions; and repeating the search and positioning steps until the mosaic representation is complete.

Further objects and advantages of the present invention will become apparent from a consideration of the drawings and ensuing description.

BRIEF DESCRIPTION OF DRAWINGS

The invention will now be described in greater detail having reference to the attached drawings, wherein:

FIG. 11, is a sample disparity matrix representing figures of visual difference;

FIG. 12 illustrates the removal of rows and columns based on tile region assignments;

FIG. 13 illustrates the composition of sub-matrices for a multiple source image and tile region assignment;

FIG. 14 illustrates the replenishment of available source images as part of the iteration steps;

DESCRIPTION OF THE INVENTION

Figure 1:
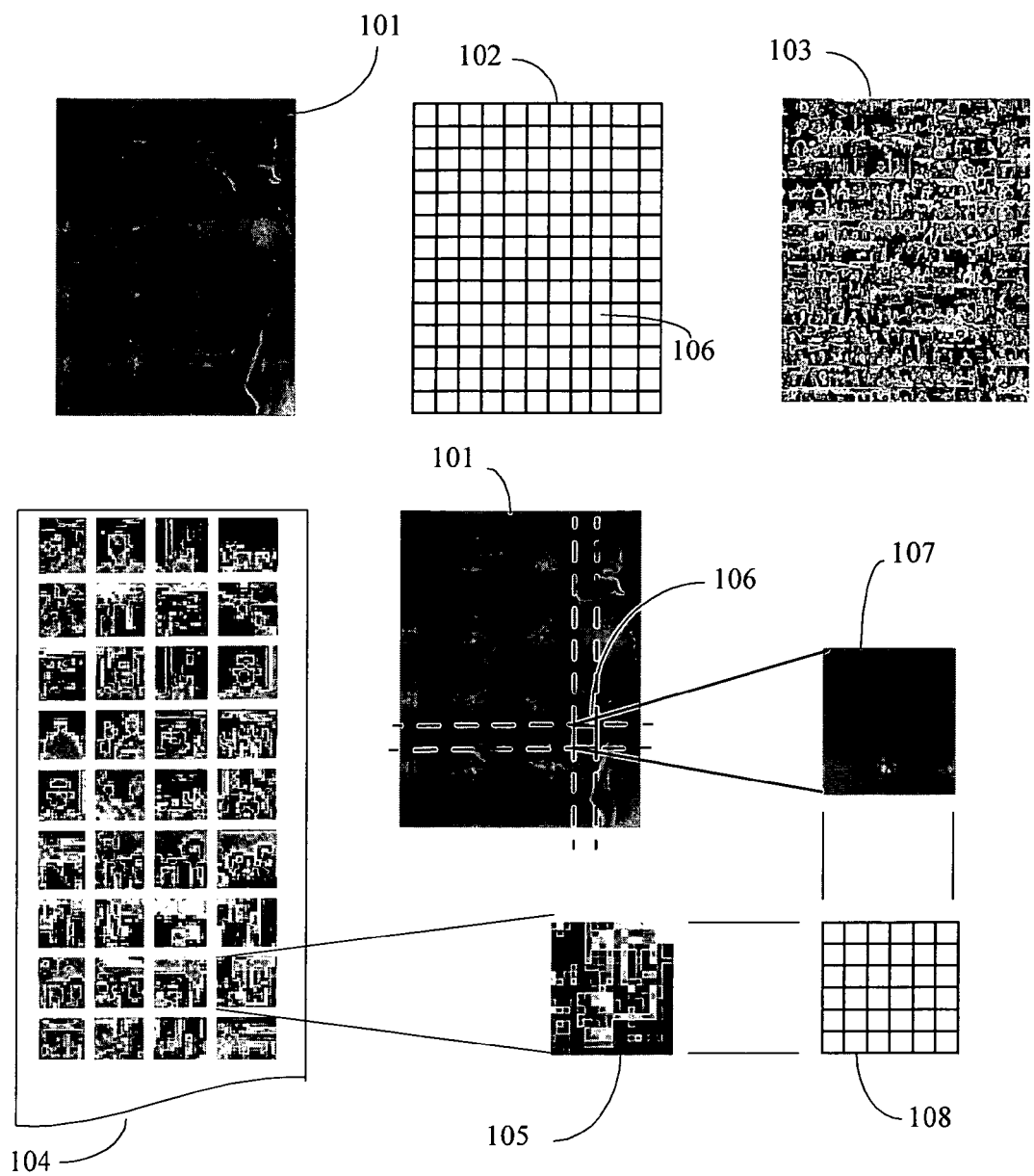
FIG. 1 describes the general concept of the invention.

The prior art and the present invention are now discussed in more detail. Referring to FIG. 1, a black and white image is a target image 101 in the composition of a colour mosaic 103. The mosaic is composed of square shaped tile images, one of which is tile image 105, that are arranged in a regular grid 102. The appearance of the mosaic resembles that of the target image. The grid divides the target image into corresponding tile regions, one of which is tile region 106. For each individual tile region, tile images from a data base 104 of tile images are compared to the tile region, to produce a figure of visual difference. The tile image with the lowest figure of visual difference is selected to represent the tile region and it is positioned at the corresponding location in the mosaic. The process of generating a mosaic hence consists of a search phase, whereby for each tile region the best suited tile image is found, and a composition phase, whereby a mosaic image is rendered through the placement of the best suited tile image in the corresponding location.

If a mosaic is composed of M-by-N tiles (M tiles in vertical direction, N tiles in horizontal direction), and if each tile is sized m-by-n pixels (m pixels in vertical direction, n pixels in horizontal direction), then at the time of composition, the final mosaic is sized M times m pixels by N times n pixels. Image resizing can be employed to change the size of the mosaic after composition, however a blurring of the tile edges in the mosaic could be an undesirable side effect. It is therefore better to consider the size (number of pixels horizontally and vertically) of the mosaic when determining the number of tiles and the size of each tile in the mosaic.

In a further refinement, tile region 106 is divided into sub-regions 108, and tile image 105 is divided into corresponding sub-regions. A tile region 107 is an enlarged version of tile region 106. The colour based comparison for visual similarity often includes the computation of the average mean square error of the red, green and blue (RGB) channels between pixels or sub-regions of the tile region and pixels or sub-regions of the tile image under consideration. If the comparison is based on greyvalue only, the measure for visual similarity is instead based on the computation of the average mean square error of the greyvalue between pixels or sub-regions. For computational simplicity the calculation step of squaring the error value can be replaced by taking the absolute value of the error value, and averaging can be simplified to summing. Also a weighting of the different colour channels in the error calculation is possible, although equal weighting is most common.

When no sub-regions are employed, the comparison is based on the red, green and blue average values of the entire tile region and the red, green and blue average values of the entire tile image.

Often the sub-regions correspond to the individual pixels of the tile and of the region. For instance, a tile sized at 16-by-16 pixels is compared to a region sized at 16-by-16 pixels. Consequently, the tile region and tile image are compared based on 16-by-16 sub-regions, each subregion covering precisely one pixel. The tile size and region size at time of comparison are in general independent from the tile size at time of composition, and this can be used to advantage by reducing the computational effort during the search phase of the mosaic composition process. This involves calculating the figure of visual difference using low resolution version of the tiles (e.g. 16-by 16 pixels), while a higher resolution version of the tiles (e.g. 256-by-256 pixels) is used to assemble the mosaic. Hence, it is beneficial to produce a low resolution version (smaller sized version) of each tile in the data base in preparation for the search phase of the mosaic generation process, and it is beneficial to produce a version of each tile in the data base with the desired higher resolution (larger size) in preparation for the composition phase of the mosaic generation process.

These large and small sizes are in general independent from the size and cropping of the underlying source image. Image resampling is used to convert a target image, a tile region or a tile image from one size to another, and it often involves image processing operations such as anti-aliasing filtering and bilinear or bicubic interpolation. For instance, a raw source image obtained by scanning a photograph, might be sized 300-by-400 pixels, whereas it is cropped and resized to a 256-by-256 square tile image for the composition phase.

In general, all tile regions in a mosaic are commonly of a same shape and size, and hence all raw source images are cropped and resized to the same shape and size. However, in some cases of mosaics, tile regions may have different sizes and different shapes throughout the mosaic to attain a particular artistic effect. When comparing an individual tile region with an individual source image, the source image is cropped to the shape of the tile region.

A colour mosaic based on a colour target image employs colour tile images. A mosaic composition may produce a black and white composition even if colour tiles are employed. In this case during the search phase greyvalue matching is accomplished by comparing regions of a black and white target image with a black and white converted version of each colour tile, but during composition the actual coloured tile is used. Then, viewing the mosaic in detail reveals the colour of the tiles, and viewing the mosaic from a distance reveals a black and white mosaic image resembling the target image. As is well known in the art, black and white images are easily produced from colour images. As a result, colour tiles can be used to compose a mosaic resembling a black and white target image. Alternatively, black and white tiles can be used to compose a mosaic resembling a black and white target image.

In colour mosaics with colour tiles, colour dithering can be employed to approximate colour regions of the target image using colours that are only available in the tile images.

After the composition phase, a further step of blending the target image with the mosaic increases the visual similarity between the mosaic and the target. This blending involves overlaying the final mosaic with a version of the target image itself that has a high degree of transparency, thus forcefully enhancing the similarity with the target image.

As discussed, in prior art tile images are obtained from raw source images by cropping the raw source image, from centre, to a rectangle or square, and resizing the dimensions as necessary. The purpose of cropping is thus to ensure that tiles of the desired shape are available for comparison and composition, regardless the shape of the raw source images. Cropping is performed from centre, since commonly this would ensure that the centered subject matter of a tile (an object, a person etc.) appears in the crop. Typically the largest possible crop is produced, considering the size of the raw source image and the shape difference between the tile image and the raw source image. Notably, for each raw source image only one cropped version is produced.

Figure 2A:
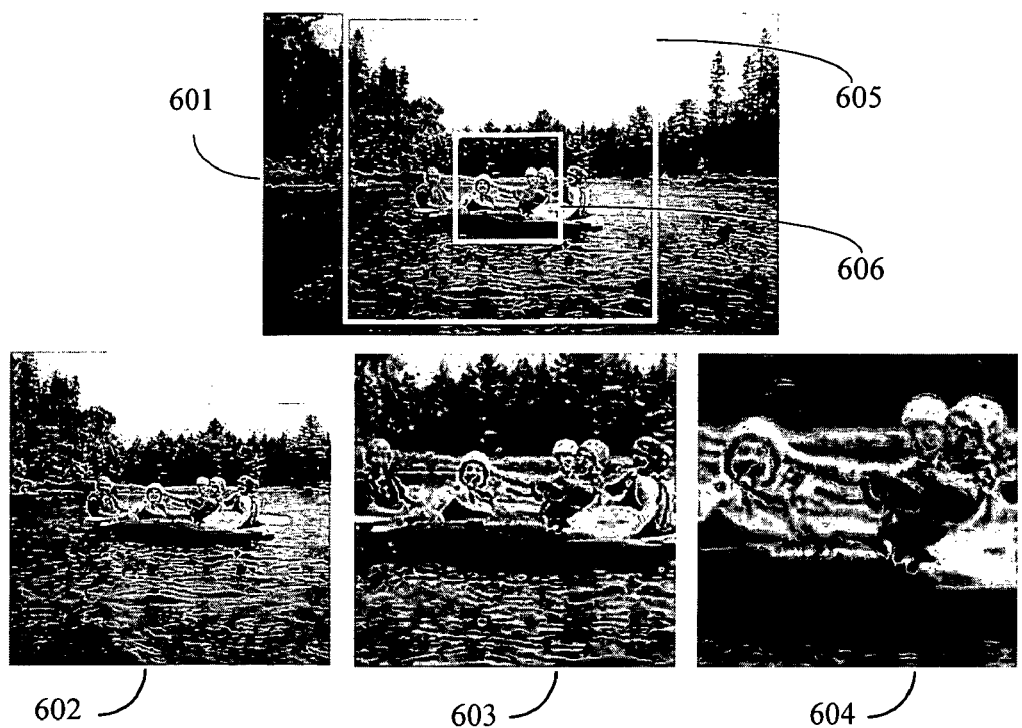
FIG. 2A illustrates the application of cropping boundaries and centered crops.

When the raw source image data base is of limited size, it is beneficial to produce multiple, different, crops corresponding to the desired shape but with varying visual effect. This is illustrated for the present invention in FIGS. 2A and 2B. FIG. 2A depicts a rectangular landscape oriented raw source image 601, with a group of kayakers as subject matter.

The figure further depicts an outer cropping boundary 605 as a white frame overlaying the image, and it further depicts an inner cropping boundary 606. These two boundaries can be set automatically by a cropping tool (not depicted) based on parameters common to all raw source images under consideration, as set by an operator. These parameters would entail the shape (aspect ratio) of the boundaries, the amount of area coverage by the outer boundary (e.g. as a percentage of the source image size), the amount of area coverage by the inner boundary, and a requirement that both boundaries should be centered with regard to the raw source image. Better results may be obtained when the operator selects the inner and outer boundary for each individual raw source image, while considering the subject matter of the image and the visual effect of cropping. This lies within the scope of the present invention.

Figure 2B:
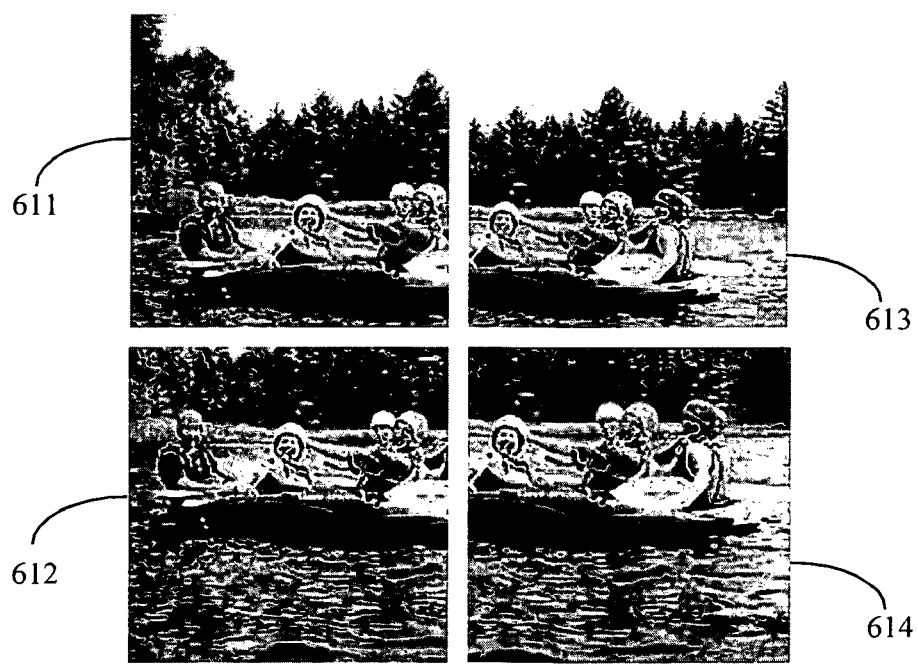
FIG. 2B illustrates the application of scattered crops.

FIG. 2A also depicts cropped tile images obtained from raw source image 601. Cropped tile image 602 corresponds to outer boundary 605. Cropped tile image 604 corresponds to inner boundary 606. Cropped image 603 is an intermediate cropped tile image. It encloses the inner boundary entirely, and it remains within the outer boundary. In this particular example, the intermediate cropped tile image is centered with the inner boundary. In addition to centered crops, also scattered crops may be obtained. As illustrated in FIG. 2B, scatter-cropped tile images 611, 612, 613 and 614 are not concentric and are not centered with the inner boundary, but they enclose the inner boundary 606 and do not exceed outer boundary 605.

Cropped tile images 602, 603, 604, 611, 612 613, and 614 are entered into a tile image data base, also called a tile library (not depicted), and are associated with source image 601 from the raw source image data base. This data base is also called a source library (not depicted). The association serves the purpose of reporting whether and where raw source image 601 is represented in the mosaic, by noting whether and where either crop appears in the mosaic, as explained in more detail further below.

The benefit of multiple croppings becomes apparent when considering the dark and light areas in the various crops of this example. For instance, the depicted sky, kayaks and water in image 602 produce three horizontal layers: a light layer (the sky), a dark layer (the trees) and a layer with intermediate brightness (the water with the kayaks). Image 604, produced form the same source image, has a different combination of horizontal layers: dark (the trees), intermediate (the kayakers) and again dark (the kayaks). Thus, a single source image can produce multiple tile images with completely different visual effects.

The lighter and darker regions of the various tiles are matched with lighter and darker sub-regions of the target image. Hence, the more variation in lighter and darker regions exist across the tile images in the tile library, the better the final composition can be when during the matching process the brightness in these regions is taken into consideration. The same holds for colour tiles, whereby not only the brightness of the regions is considered, but also the colour. Whereas for instance one crop produces a light blue layer (the sky), a dark green layer (the trees) and a greyish blue layer (the water with the kayaks), a different crop may have a different combination of horizontal layers, or the layers may be angled and thus not appear horizontal anymore.

It is now clear how cropping is not only used to obtain a tile image of the desired size, but also to produce multiple tile images with completely different visual effects. The inner boundary ensures that a desired subject matter of the raw source image is represented in all of the multiple tile images that are based on the specified inner boundary. Furthermore, in order to obtain tile images based on multiple subject matters, it is possible to repeat the production of multiple tile images based on multiple inner boundaries. For instance, one set of tile images is based on an inner boundary that covers one person's face in a photograph, and another set of tile images is based on an inner boundary that covers another person's face in the same photograph. Clearly, the benefit of creating multiple crops is that there are multiple tile images for each of the two faces. As a result, during the search phase of the mosaic generation process, depending on the particular tile region, the best tile image for either face can be selected when considering either face as a potential subject for that tile region.

In the preferred embodiment of the present invention, multiple tile images with a given aspect ratio r are obtained from a single raw source image by centered and scattered cropping according to the following. The coordinates of a point in an image are expressed in terms of a pair of pixel values (x, y), whereby the first value corresponds to the x-coordinate (the horizontal coordinate) and whereby the second value corresponds to the y-coordinate (the vertical co-ordinate). The corresponding origin is located in the top left corner of the image. Positive valued x-coordinates correspond to points to the right of the origin, and positive valued y-coordinates correspond to points below the origin. The size m×n (m-by-n) of a rectangular frame (a landscape, portrait or square frame) is expressed in terms of the number of pixels m (the x-size) along the horizontal side (the x-side) and in terms of the number of pixels n (the y-size) along the vertical side (the y-side). The aspect ratio r of the frame is r=m/n. The steps are now as follows:

1. Obtain the raw source image from the source library.
2. Define an inner boundary frame with aspect ratio r while considering the subject matter of the raw source image. Note the centre $C_i=(x_i, y_i)$ and the size $m_i \times n_i$ of the inner boundary frame.
3. Define an outer boundary with aspect ratio r while considering the subject matter of the raw source image. Note the centre $C_o=(x_o, y_o)$ and the size $m_o \times n_o$ of the outer boundary frame.
4. Define N frame sizes $m_k \times n_k$ (with k=1 ... N) based on N linearly spaced x-sizes $m_k$ starting at $m_1=m_i$ and ending at $m_N=m_o$. The y-sizes are calculated with $n_k=r \cdot m_k$.
5. Define N centered frames with centres $C_k$ (with k=1 ... N) based on N linearly spaced y-coordinates starting at $y_i$ and ending at $y_o$ each paired with the corresponding linearly spaced x-coordinates starting at $x_i$ and ending at $x_o$. As a result, the inner most centered frame (k=1) corresponds to the inner boundary frame, and has centre $C_1=C_i$ and size $m_1 \times n_1 = m_i \times n_i$. The outer most centered frame (k=N) corresponds to the outer boundary frame, and has centre $C_N=C_i$ and size $m_N \times n_N = m_o \times n_o$.
6. A scattered frame with centre $S_{k,q}$ has size $m_k \times n_k$ (as defined above) and has a corner q in common with a corner of the inner boundary as follows: a first frame has its bottom left corner (q=1) in common with the bottom left corner of the inner boundary, a second frame has its bottom right corner (q=2) in common with the bottom right corner of the inner boundary, a third frame its top right corner (q=3) in common with the top right corner of the inner boundary, and a fourth frame its top left corner (q=4) in common with the top left corner of the inner boundary. These frames are fully defined given the coordinates of a specified corner, the aspect ratio and the size. There are hence four scattered frames for each size $m_k \times n_k$. Define scattered frames for k=2 .... N−1, thus yielding a total of 4·(N−2) scattered frames.

7. Calculate the centres $S_{k,q}$ of each of the above 4·(N−2) scattered frames. This is easily accomplished using basic geometry, considering that the size and one corner of the frame is known.

8. Optionally, move the centres of the scattered frames slightly towards the centre of the inner boundary, following steps further below, to yield new centres $S'_{k,q}$.

9. Reject those scattered crops of which the frame falls outside the outer boundary, in part or in whole.

10. A plurality of crop selection frames with rectangular or square shape are thus defined by centres $C_k$ or $S_{k,q}$ (or $S'_{k,q}$), and by their sizes $m_k \times n_k$. They are stored in the tile library, in association with the underlying raw source image. The frames of the crops may be displayed as rectangular frames with thin lines overlaying the raw source image. At this point the crops may be rendered to yield high and low resolution tile images, and the resulting tile images may be presented to the operator for final approval, or the rendering may be performed at a later time, after having defined such frames for all source images first. In either case, when rendering is complete, the resulting high and low resolution tile images are entered in the tile library.

The above steps are repeated for each desired subject matter (for instance each individual face) in the raw source image. This involves re-selecting, for each subject matter, the inner and outer boundary according to the desired composition of the resulting tile images.

An automated method for the optional step of moving the centres of the scattered frames slightly towards the centre of the inner boundary is as follows, whereby the new centres $S'_{k,q}$ are based on the scattered centres $S_{k,q}$:

1. Define mixing coefficients $M_k$ for k=2 ... N−1 as follows: if N is even define K=N/2 linearly spaced values $v_1, v_2 ... v_K$ starting at zero and ending at a maximum mixing value $M_{Max}$. Then $M_2 = v_2$, $M_3 = v_3$ and so on until $M_K = v_K$ (inclusive), $M_{K+1} = v_K$ ($v_K$ is repeated), and $M_{K+2} = v_{K-1}$, $M_{K+3} = v_{K-2}$ and so on until $M_{N-1} = v_2$ (inclusive). Note that $v_1$ is discarded. If N is odd define K=(N+1)/2 linearly spaced values $v_1, v_2 ... v_K$ starting at zero and ending at a maximum mixing value $M_{Max}$. Then $M_2 = v_2$, $M_3 = v_3$ and so on until $M_K = v_K$ (inclusive), and $M_K = v_{K-1}$, $M_{K+1} = v_{K-1}$ and so on until $M_{N-1} = v_2$ (inclusive). Note that $v_1$ is discarded. The range for the maximum mixing value is $0 \leq M_{Max} \leq 1$ and a generally suitable value is $M_{Max} = 0.7$.

2. For each corner q=1 ... 4 calculate a new scattered centre $S'_{k,q} = M_k \cdot S_{k,q} + (1-M_k) \cdot C_k$. (It should be clear that the scalar multiplications are applied to the x and y coordinates separately.) The new centre is hence a weighted average of the scattered and the centered centre. The mixing coefficients ensure that when the size of the frame is close to the size of the inner boundary, the centre is located close to the centre of the inner boundary. As well, the mixing coefficients ensure that when the size of the frame is close to the size of the outer boundary, the centre is located close to the centre of the outer boundary. As a result, the subject matter within the inner boundary will be better centered within the scattered frame.

The above centered and scattered cropping is executed for each raw source image in the source library. Parameter N is set by the operator. The choice for the selected value is in part dictated by a trade off between the variety and visual range of the generated tiles versus the computational load of generating the crops and involving them in the comparison with tile regions. A suitable value for N ranges from 5 to 10.

In the preferred embodiment, the computer operator (the user) defines the crop boundaries as follows. Manual definition of an inner boundary through selection by an operator is easily accomplished with a Graphical User Interface (GUI) that displays the image and allows the user to overlay a thin-line rectangle (a selection frame with a predetermined aspect ratio) by click-and-dragging the computer mouse over the image, akin to selecting a crop area in photo editing software. The same is repeated for the outer boundary, while the selection frame of the inner boundary remains visible as an aid. The aspect ratio of the selection frame equals the desired aspect ratio of the tile images. It should be clear that other methods that select cropping boundaries are possible as well, and they lie within the scope of the present invention.

The following is an example of the application of the above steps. A software programme that implements the present invention loads a landscape oriented raw source image from a source library and presents the image on a computer screen to an operator. The image size is 500×700 pixels. The operator studies the image and draws a rectangular inner boundary frame with aspect ratio r=3/4 tightly around the subject matter using the GUI. The resulting centre of the inner boundary is $C_i = (260, 300)$ and the size is $m_i \times n_i = 100 \times 133$. In a similar manner the operator then draws a suitable outer boundary frame, of which the resulting centre is $C_o = (200, 350)$ and the size is $m_o \times n_o = 300 \times 400$. With a setting of N=6 the centres of the six centered frames are $C_1 = (260, 300)$, $C_2 = (248, 310)$, $C_3 = (236, 320)$, $C_4 = (224, 330)$, $C_5 = (212, 340)$, and $C_6 = (200, 350)$. The associated sizes are $m_1 \times n_1 = 100 \times 133$, $m_2 \times n_2 = 140 \times 187$, $m_3 \times n_3 = 180 \times 240$, $m_4 \times n_4 = 220 \times 293$, $m_5 \times n_5 = 260 \times 347$, and $m_6 \times n_6 = 300 \times 400$. Rounding has been applied as necessary. With $M_{Max} = 0.7$ the mixing coefficients are $M_2 = 0.35$, $M_3 = 0.7$, $M_4 = 0.7$, and $M_5 = 0.35$. They are based on the three linearly spaced values $v_1 = 0$ (not used), $v_2 = 0.35$ and $v_3 = 0.7$. For k=2 the scattered centres are as follows. The bottom left corner (q=1) of the inner boundary frame is located at (210, 234) and all scattered frames for k=2 are of size $m_2 \times n_2 = 140 \times 187$. Using basic geometry calculations the centre is found to be $S_{2,1} = (280, 328)$. The mixed centre is $S'_{2,1} = (259, 316)$ which is obtained by mixing $S_{2,1}$ with a factor $M_2 = 0.35$ and $C_2 = (248, 310)$ with a factor $1-M_2 = 0.65$. Other scattered centres are $S_{2,2} = (240, 328)$, $S_{2,3} = (240, 274)$ and $S_{2,4} = (280, 274)$. Other mixed centres are $S'_{2,2} = (245, 316)$, $S'_{2,3} = (245, 297)$ and $S'_{2,4} = (259, 297)$. For k=3 only one mixed frame with centre $S'_{3,2} = (240, 328)$ and size $m_3 \times n_3 = 180 \times 240$ falls within the outer boundary. For k=4 only one mixed frame with centre $S'_{4,2} = (207, 366)$ and size $m_4 \times n_4 = 220 \times 293$ falls within the outer boundary. And finally, for k=5 only one mixed frame with centre $S'_{5,2} = (201, 364)$ and size $m_5 \times n_5 = 260 \times 347$ falls within the outer boundary.

As mentioned earlier, manual definition may be replaced by an automated definition. Such automation may use image recognition techniques to identify the location and size of the subject matter (e.g. by locating the eyes, nose and mouth of a person's face), which determines the location and size of the inner boundary. This lies within the scope of the present invention. The outer boundary could be set such to cover the largest possible raw source image area considering the desired shape of the tiles, and centring it as much as possible around the inner boundary without cropping outside the raw image. Typically, if more than one subject matter is present in the raw source image, the outer boundary is selected around the desired subject matter such to avoid too much presence of the other subject matters in the resulting tiles of the desired subject matter.

Figure 3A:
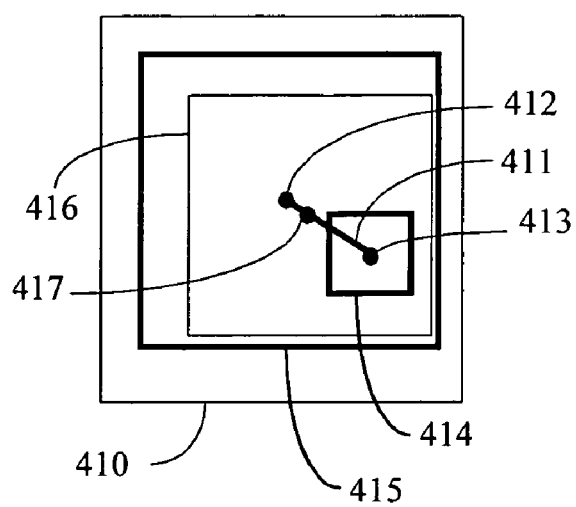
FIG. 3A describes the calculation of centered crop frames.
Figure 3B:
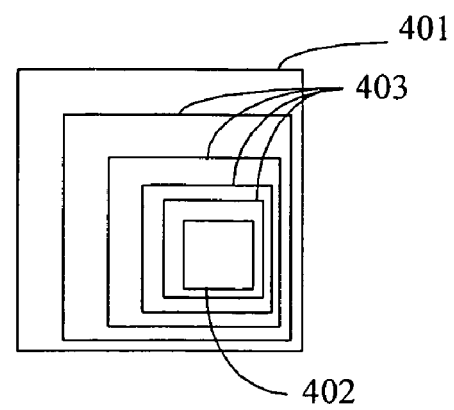
FIG. 3B illustrates several centered crop frames.

An illustration of the centre crop selection frames is provided in FIG. 3. In FIG. 3A an inner boundary 414 and an outer boundary 415 are depicted in relation to an outline 410 of a raw source image (not depicted). A line 411 connects a centre 412 of the outer boundary with a centre 413 of the inner boundary. A centre 417 of a crop frame 416 is located on the line as a result of the underlying mathematics. FIG. 3B depicts a crop frame 401 based on the outer boundary and a crop frame 402 based on the inner boundary. A further 4 crop frames 403 are depicted as well.

Figure 4A:
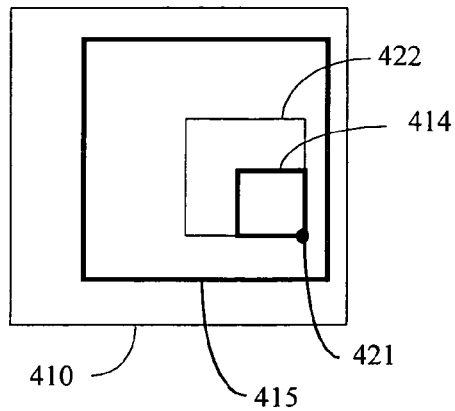
FIGS. 4A, 4B, 4C, 4D, 4E, and 4F illustrate several scattered and mixed crop frames.
Figure 4B:
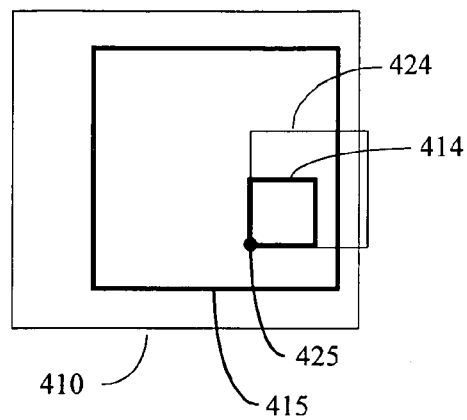
Figure 4C:
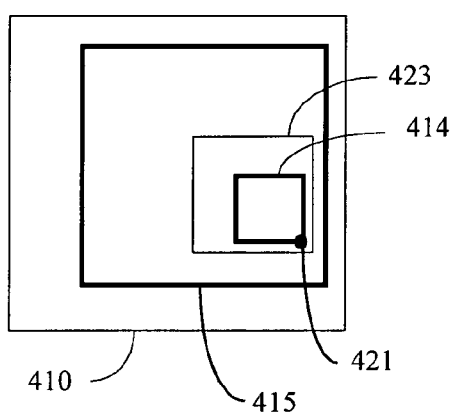
Figure 4D:
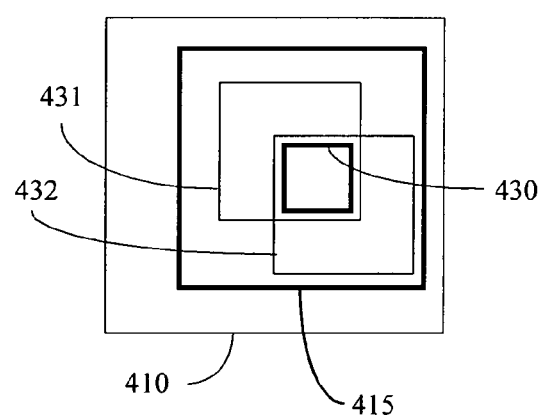
Figure 4E:
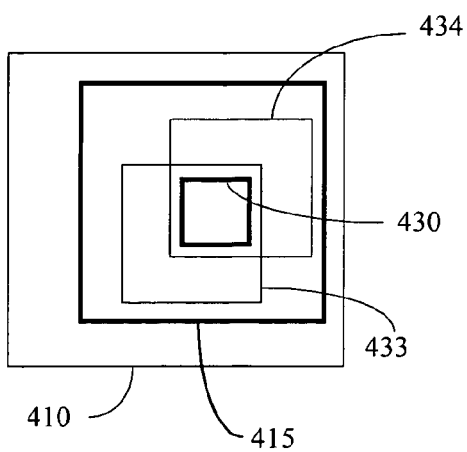
Figure 4F:
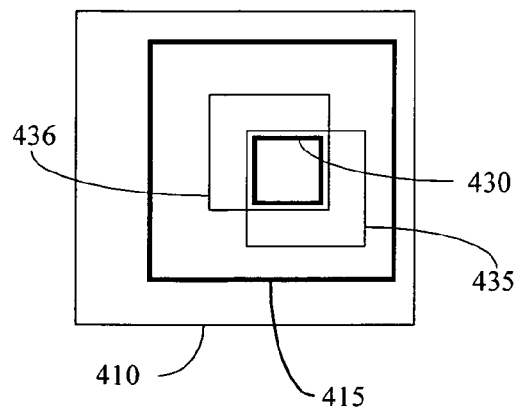

An illustration of the scatter crop selection frames is provided in FIG. 4A to 4E. In FIG. 4A. a scatter crop frame 422 shares a bottom right corner 421 with inner boundary 414. In FIG. 4B. a scatter crop frame 424 shares a bottom left corner 425 with inner boundary 414. Since it lies partially outside outer boundary 415 it would be rejected. In FIG. 4C. a scatter crop frame 423 is a version of 422, and its centre has been moved slightly towards the centre of 414. In FIG. 4D a new inner boundary 430 is depicted to better illustrate various scatter crops of equal size. Crops 431 and 432 in FIG. 4D, and crops 433 and 434 in FIG. 4E are of the same size and they correspond to the four corners of 430, with the optional step of slightly moving their centres towards the centre of 430 applied. FIG. 4F shows a further two crops 435 and 436 that are of a smaller size than 434 . These crops are based on the top left and bottom right corners of 430. Two further crops of the same size (not shown) can be generated as well, corresponding to the top right and bottom left corners of 430.

A person skilled in the art can now compose a software subroutine that automatically generates a plurality of crops from a single raw source image, whereby the crops entirely enclose an inner boundary and include a desired subject matter, and whereby the crops do not exceed an outer boundary.

It should be clear that within the scope of the present invention other techniques may be applied to generate crop parameters (shape, size, location, rotation, and other parameters) within predetermined ranges so that multiple cropped source images may be obtained based on parameter values within their respective ranges. It should also be clear that within the scope of the present invention the ranges may be determined individually for each source image, for groups of source images jointly, or for all source images together, and that the ranges may be determined by an operator and/or automatically determined based on colour data, contrast data, brightness data and other data about the images.

In the preferred embodiment of the present invention, the above cropping techniques apply digital image processing schemes to alter the composition of an image. The composition of an image is mainly determined by the relative positioning of objects and persons with respect to each other and with respect to the frame (the crop edges, the crop window) of an image. Other digital image processing techniques may also be employed to alter the composition, for instance image warping, rotation and mirroring, and these lie within the scope of the present invention.

Digital image processing techniques are now presented that alter the brightness and contrast of a raw source image. Other adjustments are possible as well such as those that alter the colour, edging and texture of areas in an image. Whereas in the preferred approach it is desired to maintain resemblance between the obtained rendered tile image and the underlying raw source image, it is also possible to apply extreme changes, such as colour remapping, for artistic effect. This lies within the scope of the present invention.

The objective of applying digital image processing is to generate a plurality of renditions from a raw source image, thus improving the resemblance of the final mosaic that uses tile images from a raw source image library of limited size. It should be clear that the application of digital image processing to generate a plurality of renditions may apply to one or more raw source images in a library, that it may be applied selectively to some images and not all images, and that the library may be of any size.

In the preferred embodiment, various combinations of contrast and brightness changes are applied to a raw source image, thus creating a plurality of tile images based on the raw source image. It is understood that in photo editing typically contrast and brightness changes may be made to an image with the intent to make the contrast and brightness of the image more pleasing. However, in general, contrast and brightness adjustments may be made within a certain range while keeping the appearance of the image satisfactory without the intent to make the image more pleasing. For instance, an image may be slightly and noticeably darkened or lightened while the subject matter is still well lit and recognizable. Also, the contrast of an image may be slightly reduced or increased while the visual details of the subject matter are still well distinguishable and recognizable. Methods for individually adjusting contrast and brightness are well known in the art.

In the following, in terms of contrast and brightness adjustment values, reference is made to contrast and brightness adjustments in Adobe PhotoShop (photo editing software by Adobe Systems Incorporated) in which the contrast adjustment ranges from −100 to +100 and the brightness adjustment ranges from −100 to +100. For the purpose of generating multiple tile images from a single raw source image, it is preferred to embed a software routine for such adjustments within the mosaic generating software. Applying stand alone photo editing software instead is cumbersome, and the reference to Adobe PhotoShop is merely made to refer to contrast and brightness adjustment values. For simplicity of operation, contrast and brightness adjustments within the range of +100 to −100 are made in steps of +/−1.

Figure 5:
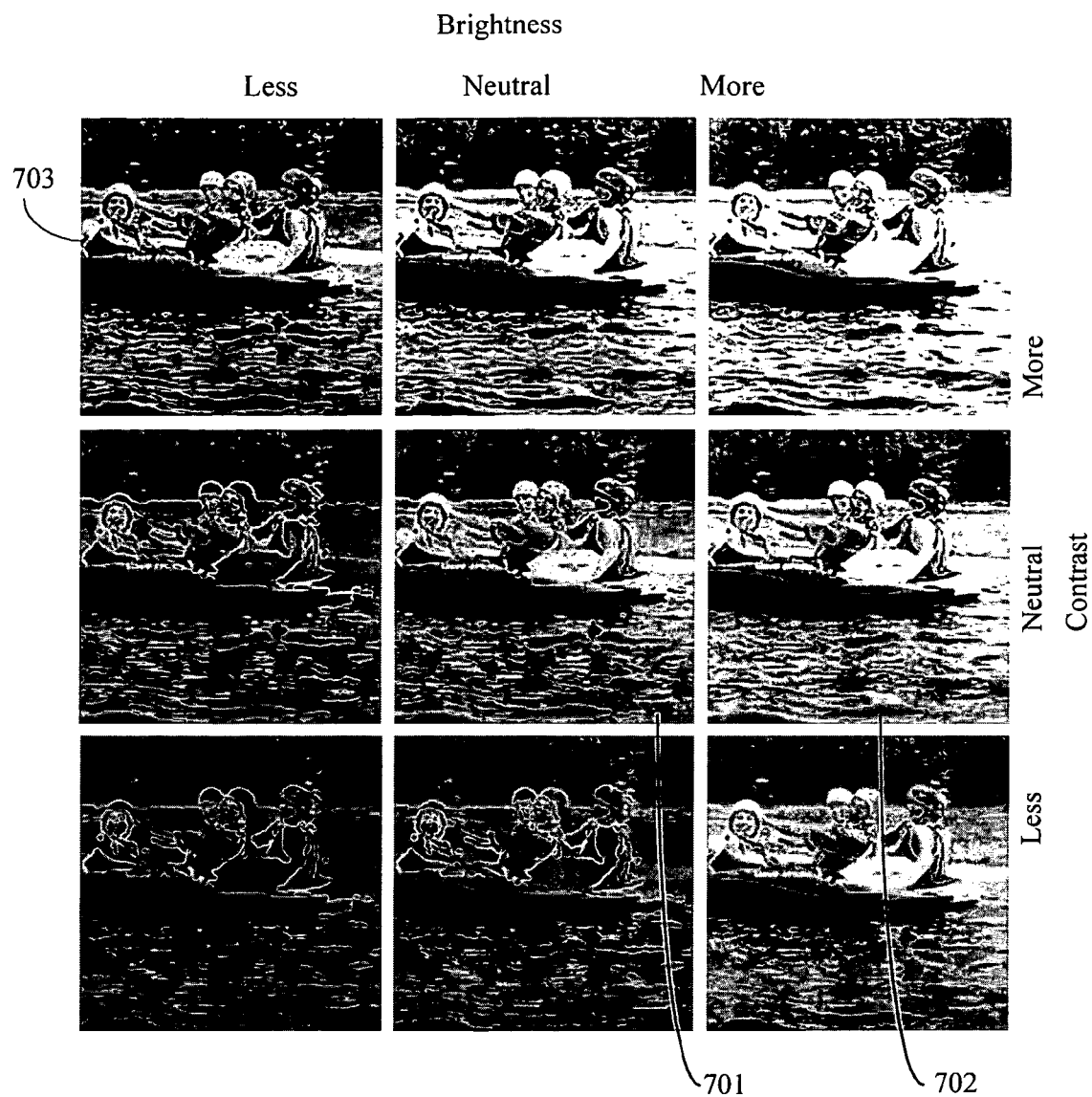
FIG. 5 illustrates the application of contrast and brightness adjustment.

Examples of contrast and brightness adjustments are provided in FIG. 5. A cropped tile image 701 with neutral contrast and neutral brightness adjustments is obtained from a raw source image (not depicted) with no adjustments, and contrast and brightness adjustments are made with respect to image 701. For instance, cropped tile image 702 has neutral contrast and maximum brightness, and cropped tile image 703 has maximum contrast and minimum brightness. These two adjusted and cropped tile images together with all other adjusted tile images in the figure are then made available by adding them to the tile library. Referring to Adobe Photoshop, for the purpose of this illustration, an adjustment of +/−30 (out of +/−100) has been applied for the contrast and brightness adjustments in the above example.

In general, contrast and brightness adjustments within a range of +/−20 provide a suitable level of adjustment, but it is preferred to set the range individually for each raw source image, as some raw source images can tolerate more adjustment than others. The ranges are mostly subjective and depend on the photographic quality and the subject matter of the raw source image. As an aid in judgement, or to automate the determination of the range, the grey-value or colour histograms of the image may be used.

The following steps determine the upper and lower boundaries for contrast and brightness adjustments of an individual raw source image, based on judgements by an operator:
1. Load the raw source image from the data base and present it to an operator in a first image display (a window in a GUI)
2. Set the contrast adjustment c to neutral: c=0
3. Set the brightness adjustment b to neutral b=0
4. In a second image display present the image with the current contrast and brightness settings applied, and when at any time the contrast or brightness are altered, the image is updated to reflect the changes
5. While keeping b=0 an operator adjusts c to find the highest possible contrast setting whereby the visual appearance remains satisfactory. That setting is noted as $c_{max}$.
6. While keeping c=0 an operator adjusts b to find the highest possible brightness setting whereby the visual appearance remains satisfactory. That setting is noted as $b_{max}$.
7. While keeping b=0 an operator adjusts c to find the lowest possible contrast setting whereby the visual appearance remains satisfactory. That setting is noted as $C_{min}$.
8. While keeping c=0 an operator adjusts b to find the highest possible brightness setting whereby the visual appearance remains satisfactory. That setting is noted as $b_{min}$.

The extreme settings $c_{max}$ $b_{max}$ $c_{min}$ and $b_{min}$ are thus obtained through adjustments by an operator, who interfaces with an image processing subroutine. These extremes may also be found automatically, for instance by following the above steps, but numerically evaluating the brightness histogram of the image, in replacement of visual evaluation by an operator. Based on these extreme settings, an automatic contrast and brightness selection tool is now able to generate multiple images from an underlying raw source image by selecting contrast and brightness pairs within the extreme settings.

Figure 6A:
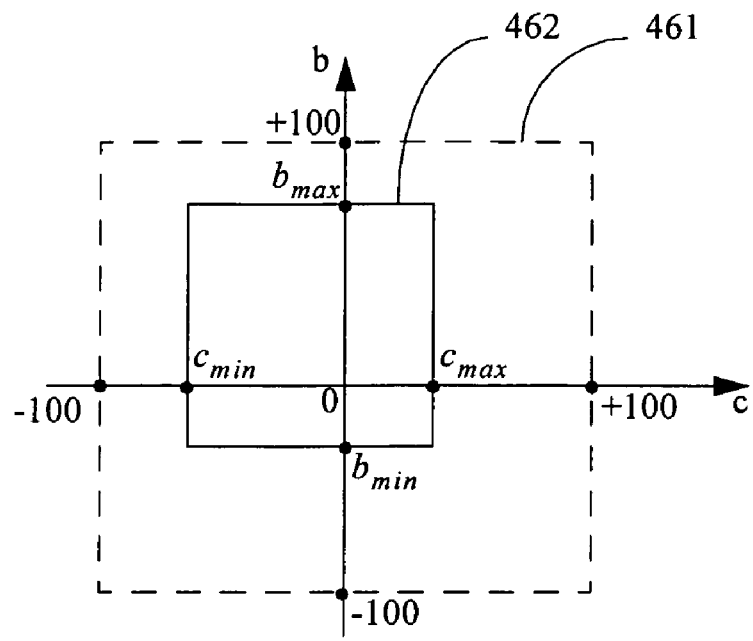
FIG. 6A illustrates the range of allowable contrast and brightness adjustments based on a limiting rectangle.
Figure 6B:
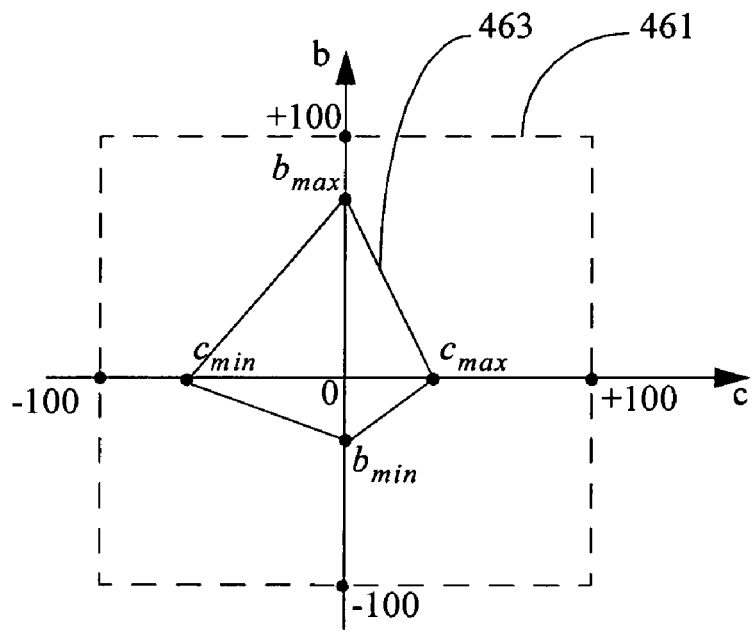
FIG. 6B illustrates the range of allowable contrast and brightness adjustments based on a limiting polygon.

FIG. 6A illustrates a possible outcome of the above steps. A limiting rectangle 462 is based on the extreme settings and has sides parallel to contrast and brightness axes in a two-dimensional plane. A second rectangle 461 is based on the maximum possible settings of +/−100. All contrast and brightness value pairs within or on rectangle 462 (with adjustment step size of 1) are deemed suitable. To reduce the amount of adjusted images generated (thus limiting the complexity of the search for suitable tiles in a composition) a larger step size may be elected, for instance 5. In FIG. 6B an alternative is provided by a limiting polygon 463 which has its corners on the horizontal and vertical axes. This is preferred over rectangle 462, as it avoids the cases whereby both contrast and brightness are set to extreme values.

An example shall further illustrate how pairs of adjustment values are obtained based on a limiting polygon with corners on the horizontal and vertical axes. Consider example extremes $c_{max}$=20, $b_{max}$=25, $c_{min}$=−15 and $b_{min}$=−10 as found for a particular raw source image by an operator. These values determine the corners of the polygon. On a grid with a contrast resolution of 7 and a brightness resolution of 9, the following points fall within the polygon (the notation is (c, b)): (0, 0), (0, 9), (0, 18), (7, 0), (7, 9), (14, 0), (0, −9), and (−7, 9). An individual tile image is then generated for each of these individual adjustment pairs, and the tile images are added to the tile library while noting the underlying raw source image. Whereas the above example employs a grid resolution of 7 for contrast adjustment values and 9 for brightness adjustment values, it suffices to have both grid resolutions equal. A suitable value for the resolution is 5.

It should be clear that within the scope of the present invention other techniques may be applied to generate image processing adjustment parameters (brightness, colour, contrast and other adjustments) within predetermined ranges so that multiple processed source images may be obtained based on selected parameter values within their respective ranges. It should also be clear that within the scope of the present invention the ranges may be determined individually for each source image, for groups of source images jointly, or for all source images together, and that the ranges may be determined by an operator and/or automatically determined based on colour data, contrast data, brightness data and other data about the images.

A person skilled in the art can now compose a software subroutine that automatically generates from a single raw source image a plurality of tile images by adjusting the brightness and contrast of the raw source image within preset bounds that are specific to the raw source image.

In the preferred embodiment, cropping is combined with contrast and brightness adjustment to generate multiple tile images from a single raw source image. This is accomplished as follows:
1. Load a raw source image from the source library.
2. Find a plurality of suitable crop frames for the raw source image, using the cropping method described above.
3. Find a plurality of contrast and brightness adjustment values for the raw source image, using the contrast and brightness adjustment described above.
4. For each crop frame, apply each possible pair of contrast and brightness adjustment, and save the cropped and adjusted image as a tile image in the tile library.

It is now clear how an operator determines suitable crop extremes and suitable adjustment extremes, and how an automated process generates a plurality of tile images with varying composition, contrast and brightness based on the operators specific settings for an individual raw source image. The above cropping and adjustments can be generalized to other forms of digital image processing and it may include the step of manual digital photo editing and manual digital graphic as long as the goal is to produce multiple renditions of a single raw source image. These variation lie within the scope of the present invention.

It should also be clear that the crop extremes and adjustment extremes may be set to values that apply to all images in the source tile library jointly. Thus, in contrast to the above, one set of extreme values is selected and the one set applies to all images. This enables the generation of a multitude of processed source tile images from a limited data base without much interaction from the user. This also lies within the scope of the present invention.

The following highlights some properties of the relationship between raw source images, renditions (tile images from raw source image) and subject matters. First, generally there are multiple renditions of a single raw source image (e.g. darker, lighter, larger crop, smaller crop), but there may also be only a single rendition of it (e.g. the image is only cropped, and cropped only once). This implies that one or more source images can be generated from a single raw source image. Secondly, generally there are multiple raw source images of a particular subject matter (e.g. multiple pictures of the same person), but there may also be only a single raw source image of a particular subject matter (e.g. just one portrait photo of a person). Thirdly, there may also be a single raw source image containing multiple subject matters (e.g. a group of people, whereby each person is a separate subject matter).

In one embodiment of the invention, all renditions are treated as individual tiles in a tile library without consideration of their associated subject matters. Each tile in the library is compared with each tile region to produce a figure of visual difference, and the assignment of a tile image to a tile region is made based on that figure.

In the preferred embodiment of the invention, the renditions are tiles in a tile library whereby each tile is associated with the underlying subject matter. In a first matching step, all renditions of a selected subject matter are compared with a selected tile region, and the best matching rendition (the rendition with the lowest figure of visual difference) is identified. This is repeated for all subject matters and the selected tile region, thus producing a list of candidate renditions for the selected tile region. Each subject matter produces one candidate, and the production of candidates is repeated for each tile region. In a second matching step, for each tile region one of the candidates is identified as the preferred candidate, again based on the figure of visual difference. As will be explained in more detail below, other factors in addition to the figure alone may play a role in the selection of the preferred candidate.

In order to facilitate the ability to cover multiple subject matters that are present in a single raw source image, it suffices to copy the raw source image within the raw source image data base for each subject matter. For instance, if the raw source image is a digital photograph of two faces, a simple way to ensure that either face is considered a separate subject matter is to enter the photograph twice: once for one face and once for the other, and labelling of either raw source image is done according to the name of the person whose face is centered in the crop.

As is clear from the above explanations, there are multiple tile images associated with a single subject matter. This involves producing multiple renditions of a raw source image. During the composition phase of the mosaic generation, each of the multiple renditions is compared to an individual tile region, and the best rendition with best visual similarity is considered the candidate rendition (a candidate tile image). Importantly, during this step the candidate rendition is not yet assigned to the tile region, yet the candidate is a potential tile. This step finds for each subject matter the best matching rendition for a particular tile region. During a second step all candidate renditions for a particular tile region are considered and the best matching candidate tile becomes the preferred candidate tile. Recalling that each candidate rendition is associated with a single subject matter, the assignment of a preferred candidate tile to a tile region is also an assignment of the underlying subject matter to that tile region. For instance, if a darker rendition of a raw source image of a person's face is assigned to a dark tile region, at the same time the name of the person (the subject matter, the label of raw source image, the title of the image) is associated with that tile region.

In the above preferred embodiment, digital image processing has been applied to generate multiple renditions in preparation for the search for a tile region dependent candidate rendition, and the cropping and contrast and brightness adjustments are performed without knowledge of the target image or any tile region in particular.

Alternatively, cropped renditions may be produced whereby a cropping or a contrast and brightness adjustment is made with consideration of an underlying tile image. Hence, instead of generating brighter renditions as well as darker renditions for potential use, renditions are made that are tailored for a particular tile region. This lies within the scope of the present invention. For instance, if a tile region is on average much darker than the source image that is to be adjusted, a suitable adjustment may be found by only applying contrast and brightness adjustments that would darken the rendition of the source image, thus omitting the calculation of lighter renditions.

It lies within the scope of the present invention to apply digital processing after a suitable tile region for the source image has been determined, whereby for instance contrast and brightness adjustments are made within certain extreme values (within a suitable range) in order to further reduce the figure of visual difference. The search for an optimum combination of contrast and brightness adjustment is accomplished by an optimization method with two bounded variables, whereby the variable to be minimized is the figure of visual difference between the tile region and the adjusted tile image. Methods for finding an optimum based on two or even more parameters are well known in the art. It is now clear how digital image processing is applied based on a region, after a suitable region or a possible region has been located for the source image.

It should be clear that digital image processing may be applied (before or after placement) regardless of the type of search method applied (present invention or prior art) to generate the mosaic. It should be clear that digital image processing in the present invention is different from blending (prior art) the mosaic image with the target image by overlaying a transparent rendering of the target image.

Figure 7:
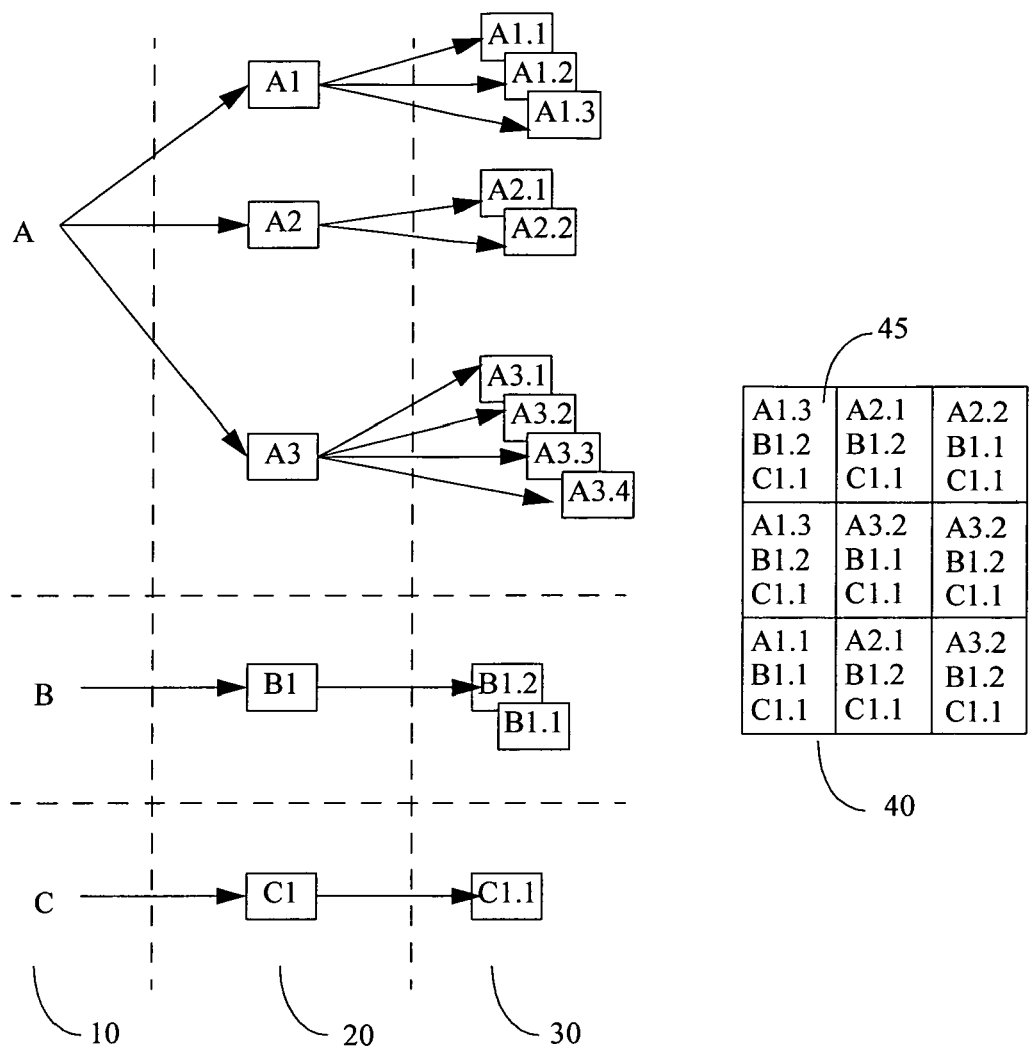
FIG. 7 illustrates the relationship between subject matters, source images, renditions, candidate renditions and individual tile regions of a target image.

In the following, an illustration of the preferred embodiment describes how the multiple renditions of a raw source image are considered in the composition phase of the mosaic generation, particularly highlighting the organization of the tile images based on their underlying subject matter. FIG. 7 illustrates the relationship between subject matters, source images, renditions, candidate renditions and individual tile regions of a target image. Shown are labels 10 for subject matters, labels 20 for raw source images, labels 30 for renditions and an array 40 of tile regions. The relationship between tile regions and tile images has been provided in FIG. 1, and a method to determine candidate renditions will be described further below.

In the example, three raw source images A1, A2 and A3 are associated with subject matter A; one raw source image B1 is associated with subject matter B; one raw source image C1 is associated with subject matter C. The images themselves are not shown, only their labels. The subject matters (not shown) are, for instance, individual persons, but also flowers, buildings etc. A raw source image could then be a digital photograph of a person, and A, B and C would be the names of the three different people (not shown). Thus, for instance A1 to A3 are three photographs of person A. Through digital image processing, 3 renditions of raw source image A1 are produced: rendition A1.1, A1.2 and A1.3 (the digital image processing could comprise of a combination of cropping with contrast and brightness adjustments). As well, through digital image processing, 2 renditions of raw source image A2 are produced: renditions A2.1 and A2.2. As well, through digital image processing, 4 renditions of raw source image A3 are produced: renditions A3.1 to A3.4. Furthermore, through digital image processing two renditions of raw source image B1 are produced: renditions B1.1 and B1.2. Furthermore, through digital image processing one rendition of raw source image C1 is produced: rendition C1.1. Since there are three subject matters, there are three candidate renditions for each tile region. A sample tile region 45 lists three candidate renditions, one for each of the three subject matters A, B and C. The illustration shows that the rendition of subject matter A that best matches tile region 45 is A1.3; the rendition of subject matter B that best matches tile region 45 is B1.2; and for subject matter C the only rendition C1.1 is the candidate rendition.

Whereas for the purpose of illustration this example is based on 3 subject matters and at most 9 renditions per subject matter (subject matter A), it should be clear that the number of subject matters and renditions are generally only limited by the computing complexity and memory requirements. Typically there are tens to hundreds of subject matters, and each subject matter may have tens of renditions. Of course, in one extreme it is also possible to render all tile images in the tile library based on only one raw source image, and this lies within the scope of the present invention. In general, multiple renditions may be produced based on a source image, regardless the subject matter of the source image, and regardless whether one or multiple source images are associated with a subject matter. In general, applying digital image processing to raw source images is to be seen as a step that does not necessarily require the definition of subject matters. It is now clear how digital image processing is applied before a suitable region has been located for the source image. In the preferred embodiment, there is one single raw source image for each subject matter. Thus, a unique title or file name of the raw source image is a suitable label for the subject matter.

Figure 8:
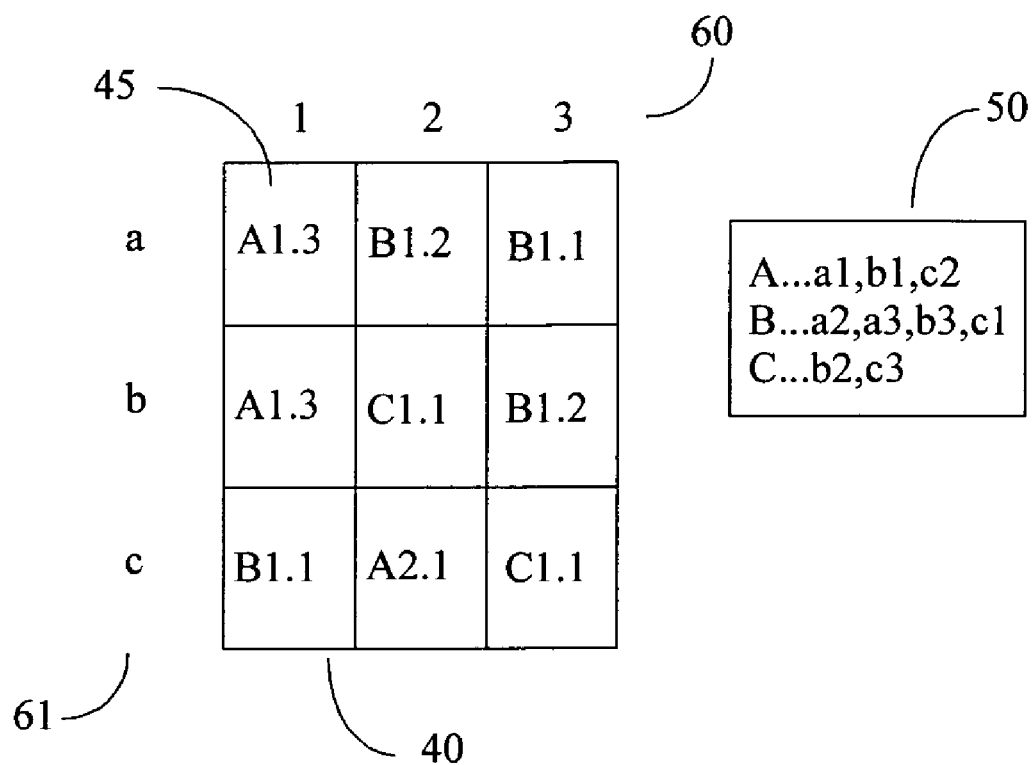
FIG. 8 illustrates a possible preferred candidate for each tile region.

FIG. 8 illustrates a possible preferred candidate for each tile region, as would be determined during the search phase. An index 50 provides as an aid to find all instances of subject matters in the final composition. The coordinates in the index relate to numerals 60 which indicate the horizontal tile coordinate, and to literals 61 which indicate the vertical tile coordinate. Clearly, in a composition with hundreds of tile images, the index is a useful aid to spot specific subject matters quickly. The index could be used to locate pictures of specific people in the mosaic. The index is composed as follows in the preferred embodiment. Whenever for a particular tile region it is determined which source image shall be placed at the corresponding location in the mosaic, the co-ordinates of the tile region are noted in association with the title of the source image. The title would be a brief description of the subject matter of the source image.

Thus, if the source image depicts a person, the title of the source image could be the name of the person. In order to compose the index list, the titles are listed in alphabetical order, and for each index entry (a title) in the index list, the region co-ordinates of each occurrence of that particular subject matter (as described by the title) are listed. This is similar to an index for a street map, whereby a single street name may apply to multiple box areas in a street map. The tile region co-ordinates in terms of an x- and y-index pair may be remapped to an alphanumeric and numeric pair as accustomed in maps and atlases. With reference to the figure, the simplified mosaic comprises of 9 tiles, each tile baring a unique co-ordinate from 'a1' to 'c3'.

It is also possible that more than one tile region is assigned a same alphanumeric and numeric pair. This would be the case if the mosaic is composed of for instance 30 by 30 tile regions, whereby the mapping co-ordinates are '1' to '5' horizontally and 'a' to 'e' vertically. A single map area (a box, such as 'a1', 'a5', 'b3' etc.) comprises of 6 by 6 tiles, totalling 36 tiles. Akin to a map, the co-ordinate labels '1' to '5' are then displayed (printed) from left to right across a border above the image, and co-ordinate labels 'a' to 'e' are then displayed (printed) from top to bottom across a border left of the image.

It should be clear that an index may be applied to a mosaic image, regardless of the type of search method applied, and regardless of the digital image processing.

Figure 9:
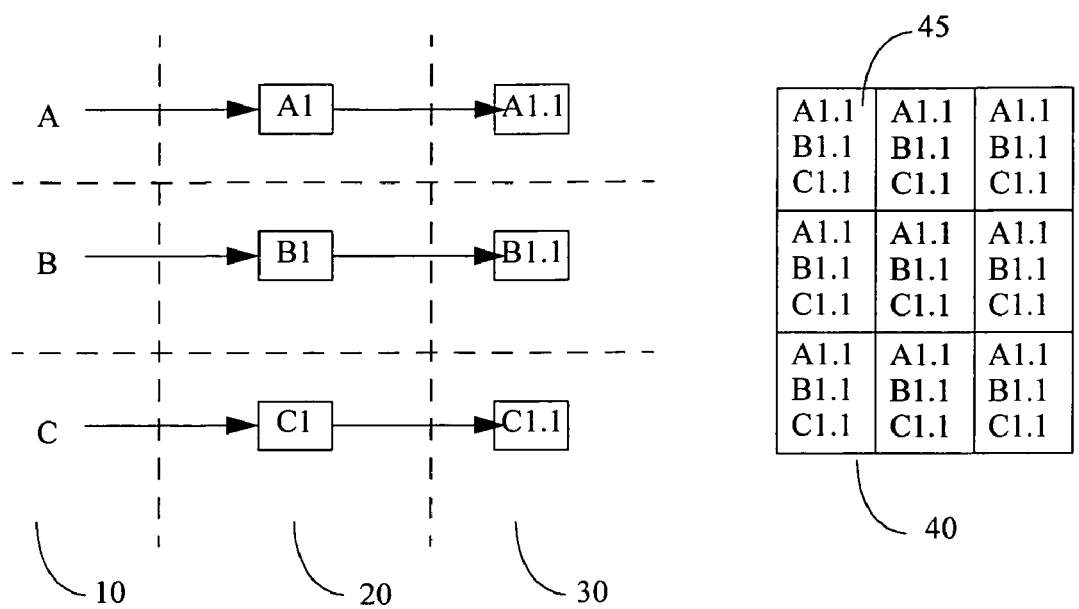
FIG. 9 illustrates the case whereby there is one raw source image per subject matter, and only one rendition per raw source image.

FIG. 9 illustrates the case whereby there is one raw source image per subject matter, and only one rendition per raw source image. Clearly, the three candidate renditions are the same three across all tile regions, and hence the first matching step (in which the candidate rendition is produced) can be omitted without affecting the final composition.

As appreciated by one in the art, when the tile image and the target image are represented by Red, Green and Blue (RGB) pixel values, a suitable figure of visual difference would be based on the pixel-by-pixel squared sum RGB difference between the tile image and the tile region under consideration. More precisely, if the RGB pixel values in the tile region under consideration are $R_i$, $G_i$ and $B_i$ (index i=1 . . . N covers all pixels in the rectangular or square region, and that region can be consider as an image itself), and if the RGB pixel values in the tile image under consideration are $r_i$, $g_i$ and $b_i$, (whereby the tile region and the tile image are of equal size) then a figure of difference based on the summed square with equal weighting of the three colour channels is $$e = \sum_{i=1 \ldots N} ((R_i - r_i)^2 + (G_i - g_i)^2 + (B_i - b_i)^2)$$

In the case whereby the tile image and tile region are compared based on the grey values $V_i$ and $v_i$, a suitable figure of difference would be based on grey value difference:

$$e = \sum_{i=1 \ldots N} (V_i - v_i)^2$$

Colour RGB images are easily transformed to a grey value image, and this is useful if the tile matching is performed for colour tiles and a black and white target image.

In general, a smaller value of the figure of visual difference implies a better match between a tile region and a source tile image. The lower the figure, the more visually similar the two are and the more preferred an assignment of the image to the region is. Hence a high figure of visual difference implies a low measurement of visual similarity, and a low figure of visual difference implies a high measurement of visual similarity.

The calculation of the RGB channel differences is one method to determine visual similarity based on a mathematical calculation. Other techniques exist as well, for instance methods based on Hue Saturation and Value (HSV), or based on average colour, or based on statistics of colour and brightness, or based on edge detection. In the preferred embodiment of the present invention the figure of difference is based on the summed square with equal weighting of the three colour channels, and other techniques lie within the scope of the present invention.

A method is now described that selects the preferred candidate for each tile region. The method is best understood in terms of mathematical operations on a matrix D that represents figures of visual difference. Matrix D shall be called a Disparity Matrix, since each element is a figure of visual difference, which is a measure of visual disparity. Each column of the matrix corresponds to an individual position (a tile region), whereby the positions are numbered 1 . . . $N_P$ uniquely identifying each tile region in the target image, a two-dimensional plane of tile regions. Each row of the matrix corresponds to a source (an individual subject matter), whereby the sources are numbered 1 . . . $N_S$. Hence the size of matrix D is $N_P \times N_S$. The entries in the matrix are figures of visual difference based on the tile region (identified by the row number) and on the candidate image of the subject matter (the subject matter is identified by the column number). A candidate matrix T lists for each subject matter and for each tile region the label of the rendition that is the candidate rendition for the tile region.

Figure 10:
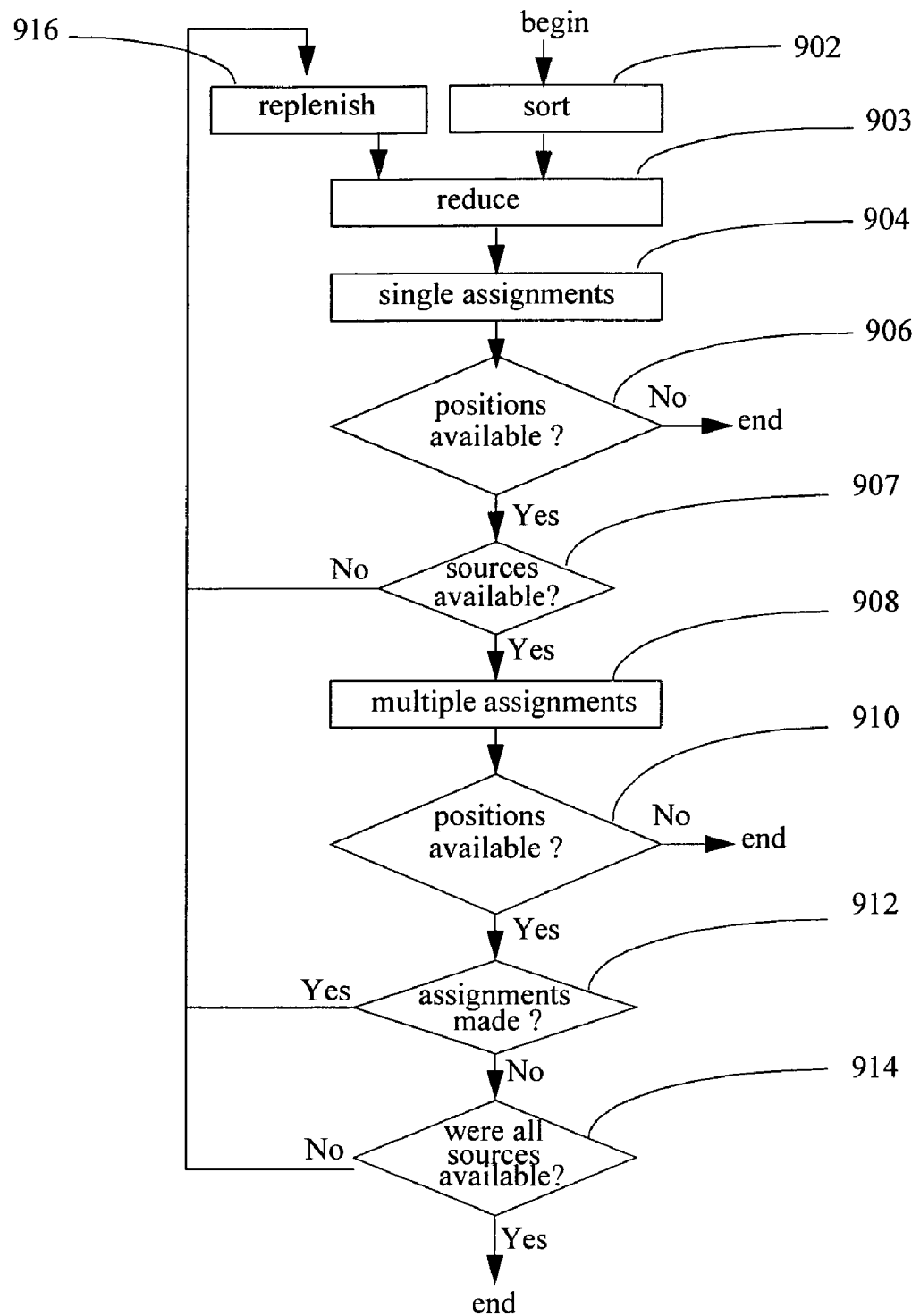
FIG. 10 describes the flow of operations for the search stage of the present invention.

Reference is now made to the flow chart in FIG. 10. The flow begins at operation 902 whereby matrix D is provided. The operation sorts the elements in each individual column of matrix D in ascending order. The result is $D_s$ and an index matrix $D_x$, whereby $D_s$ contains the sorted elements and $D_x$ contains the original row index of each sorted element as follows: $D_S(r, c)=D(Dx(r, c), c)$ for all rows $r=1 \ldots N_P$ and for all columns $c=1 \ldots N_S$. The top row in $D_x$ hence indicates for each source (identified by the column number) the best matching position (identified by the value of the element in the top row). A copy of $D_x$ and $D_s$ are made as well: $D_x'=D_x$ and $D_s'=D_s$.

Operation 903 reduces matrix D to size $N_P \times N_S'$, with $N_S'=N_P$, in the event that there are more subject matters than tile regions. This is accomplished by calculating for each column individually the sum of all elements (across all rows), and by pruning the columns with the highest sum from the matrix, thus removing subject matters from consideration until there are $N_S'$ subject matters left. The column sum is a general indication of the suitability of the candidate rendition of a subject matter considering all tile regions as a potential assignment. An alternative to calculating a sum of the entire column is to consider the minimum element of each row and to prune the matrix by removing the column with the highest minimum in comparison with the minimums of the other columns. Operation 903 identifies the beginning of a new iteration of the flow.

Operation 904 assigns sources to positions based on the top row in $D_x$ while considering only those positions that occur precisely once in the top row. The assignments made are single assignments, and they can be made simultaneously. Furthermore, in $D_s$ and $D_x$ the rows and columns corresponding to the assignments are removed from consideration, reflecting that the assigned sources are no longer available for assignments and that the assigned positions are no longer available for assignments. It is important to note that the top row indicates which tile region is the best tile region for a particular tile image, and that tile image is then assigned to the best tile region. This is in contrast to the prior art, whereby the best tile image for a particular tile region is assigned to that tile region.

Condition 906 ends the flow if there are no positions available any more, otherwise the flow continues with condition 907.

Condition 907 checks for the availability of sources. If no sources are available, the flow continues with operation 916, otherwise the flow continues with operation 908.

Operation 908 assigns sources to positions based on the top row in $D_x$ while considering only those positions that occur more than once in the top row. The assignments made are multiple assignments for a group of sources and positions. This step thus assigns simultaneously multiple sources to multiple regions. Furthermore, in $D_s$ and $D_x$ the rows and columns corresponding to the assignments are removed from consideration, reflecting that the assigned sources are no longer available for assignments and that the assigned positions are no longer available for assignments. Multiple assignments are made by first considering square sub-matrices $\tilde{D}_s$ and $\tilde{D}_x$ of $D_s$ and $D_x$ respectively which are composed and applied as follows:

1. select the position with the least number of multiple occurrences in the top row. The number is by definition greater than one. If more multiple positions share the same minimum number of occurrences, one of them is selected randomly. Define q to be the number of occurrences.
2. $\tilde{D}_x$ is composed of the top q rows of the q columns in $D_x$ which have the selected position in their top row. $\tilde{D}_s$ is defined as the sub-matrix that corresponds to $\tilde{D}_x$.
3. the sub-matrices are searched for a simultaneous assignment of q sources to q positions whereby the sum of the visual differences corresponding to the assignment (as calculated from elements $\tilde{D}_s$) is the minimum possible sum, and whereby for obvious reasons each position only occurs once in the assignment. This is easily accomplished by considering all possible multiple assignments represented by $\tilde{D}_x$ (there are at most $q^q$ such multiple assignments) and by calculating the sum over the q visual differences of the assignment. The multiple assignment is then selected. This step is particularly illustrated in a following example.

This part of the invention provides means to handle the conflicting case in which multiple tile images most prefer a single and same tile region. Clearly, in contrast to the single assignment case from above, an immediate assignment is not possible. The above sub-steps provide the preferred method to make multiple assignments while considering the ranked (sorted) preferences of each tile image. An alternative with less computational effort includes making q random assignments based on the sub-matrix $\tilde{D}_x$.

Since the complexity for the search of a suitable assignment is of the order $q^q$, it is practical to limit q. A suitable limit is q=5 or q=6, but in general the limit depends on the speed and memory capabilities of the computing equipment. The limit is then found experimentally by increasing a maximum allowable value of q, $q_{max}$, until the execution time reaches unacceptable duration. In the event that q exceeds the desired maximum $q_{max}$, sub-matrices according to $q_{max}$ are obtained in replacement of the sub-matrices according to q. This is easily accomplished by reducing $\tilde{D}_s$ and $\tilde{D}_x$ to their top $q_{max}$ rows and left most $q_{max}$ columns. The preferred reduction involves the calculation of the column sums over the top $q_{max}$ rows, and selecting the $q_{max}$ columns with the lowest sum, and again the top $q_{max}$ rows.

Condition 910 ends the flow if there are no positions available anymore, otherwise the flow continues with condition 912.

Condition 912 examines whether during the most recent iteration of the flow any single or multiple assignments have been made. If this is the case, the flow continues with operation 914, otherwise the flow continues operation 908.

Condition 914 examines whether during the most recent iteration of the flow all sources as originally present in the potentially reduced matrix D were available. If this was not the case, the flow continues operation 916 otherwise it ends.

Operation 916 checks whether matrix $D_S$ contains at least one column for consideration. If this is the case, the flow immediately continues with operation 903. Otherwise, all sources in the potentially reduced matrix D are made available again for consideration prior to continuation with operation 903. This means that for each remaining position the sorted elements and the sorted indices of all sources are made available in $D_s$ and $D_x$ for reconsideration, using the data in the copies $D_s'$ and $D_x'$. As a result, $D_s$ and $D_x$ again have $N_S'$ columns. The number of rows remains unchanged, as it reflects the number of unassigned positions.

The involvement of a visual difference threshold (not shown in the flow) provides a further enhancement of the final composition. If thresholding is applied, an assignment is only executed if the underlying visual difference is less than a specified threshold value. This value can in general be an individual value for each individual tile image, but in the preferred embodiment this value is general to all tile images, thus allowing the use of a single value for a complete mosaic. The desired threshold value is best determined based on experimental experience. A suitable threshold is found by performing mosaic compositions for various threshold values and selecting the composition that delivers the best trade-off between visual similarity of the mosaic with the target image on the one hand and a wide distribution of tile images and subject matters present in the mosaic on the other hand. The lower the threshold, generally the better the similarity, and the higher the threshold, generally a higher variety of subject matters is present in the final mosaic. It is up to the judgement of the operator to select a suitable balance. Better results may be obtained if the threshold is made to depend on the tile region. It is particularly beneficial to identify a rectangular area in the target image that contains the target subject matter (e.g. a face that the mosaic is to resemble) and to set a lower threshold for tile regions in that area. The surrounding are of the target image may then have a higher threshold or even have the threshold disabled. This allows the assignment of tile images with good visual similarity (generally low figures of visual difference) in the critical area (with a low threshold), and it allows the assignment candidate tiles of generally difficult to place subject matters (generally high figures of visual difference) in less critical areas (with a high threshold).

In the event that certain subject matters are required to be represented in the composition (as opposed to being optional), during a first set of iterations the above flow is executed with disabled threshold and with matrix D only representing the required sources, until at least the first time that replenishing is required. At this point all required sources appear at least in one position. A second set of iterations of the flow is then commenced, whereby D represents all sources, the required ones as well as the optional ones. Of course, the filled positions from the first set of iterations are omitted. During the second set, the desired threshold is applied. If the flow ends at condition 914 while not all position have been filled, a third set of iterations is commenced with the threshold disabled, ensuring that eventually all positions are filled.

An example shall now illustrate the above. In FIG. 11, a sample matrix 921 represents figures of visual difference for a case in which there are five subject matters and ten tile regions. Generally there are many more tile regions and many more subject matters, and this selection in this example is made for simplicity of illustration. The figures of difference have been normalized such that they lie in the range 0 . . . 1. Element 924 for instance, with a value of 0.69, represents the figure of visual difference between subject matter number three (third column) and position number two (second row). Positions are typically numbered by starting at the top left corner tile region, and traversing the columns of tile regions until the bottom right tile 345 region is reached. A corresponding sorted matrix 923 with associated index matrix 922 are obtained from matrix 921 by executing operation 902 of the flow. Element 926 of matrix 923 represents element 924 and is also located in the third column, considering that each column is sorted independently. Since the value of 0.69 is the highest value in the column, it is placed in the lowest row of 923. Since it originated in the second row of 921, element 925, located in the lowest row of the third column of 922 has a value of 2. As there are more positions than sources, operation 903 of the flow does not reduce the number of sources. In operation 904 two single assignments are identified, based on elements 927 and 928 in matrix 922. Element 927 causes an assignment of source number 4 (column 4) to position 1 (element value 1), and element 927 causes an assignment of source number 5 (column 5) to position 6 (element value 6). With reference to a mosaic, the candidate rendition of the subject matter associated with column 4 is thus to be placed in the mosaic at the tile region associated with position 1, and the candidate rendition of the subject matter associated with column 5 is thus to be placed in the mosaic at the tile region associated with position 6.

FIG. 12 illustrates which rows and columns corresponding to the assignments are removed from consideration by operation 904. In matrix 931 and matrix 932 columns 4 and 5 are stricken out, as they correspond to the assigned sources numbered 4 and 5. Furthermore, element groups 933 and 934 that refer to positions 1 and 6 are stricken out as well. The elements are found by searching for element values 1 and 6 in matrix 931 and by identifying the matching elements in matrix 932. In the example these element values are lumped, but this is not the case in general.

Condition 906 in the flow leads to the execution of condition 907, since there are still positions available. More precisely, there are 8 positions available, as is evident from the number of not-stricken rows. Condition 907 leads to the execution of operation 908, since there are still sources available. More precisely, there are 3 sources available, as is evident from the number of not-strike columns. Through inspection of matrix 931 in operation 908 a multiple assignment with respect to position 7 is identified with q=3.

FIG. 13 illustrates the composition of the sub-matrices for the resulting multiple assignment with q=3. Sub-matrix 941 is obtained from matrix 931, and sub-matrix 942 is obtained from matrix 932. Coincidentally, the three rows in 941 are identical, but this is generally not the case. Of the $3^3$ possible assignments, only 8 are valid, considering that each position shall only be used once, and each source shall only be used once. A first assignment is source 1 to position 7, source 2 to position 5 and source 3 to position 4. The sum of the corresponding three figures of difference is 0.18+0.22+0.28=0.68. For abbreviated notation, this case is labelled "7/5/4" with sum 0.68. Further assignments are "7/4/5", "5/7/4", "5/4/7", "4/7/5" and "4/5/7". The winning assignments are "7/5/4" and "7/4/5" with equal sums, and of the two, "7/4/5" is selected randomly.

Condition 910 in the flow then leads to the execution of condition 912, since there are still positions available. More precisely, there are 5 positions available. Condition 912 leads to operation 916 since assignments have been made during this iteration. More precisely, 2 single assignments and one triple assignment have been made during the first iteration. Operation 916 replenishes the available sources by re-entering sources 1 to 5.

The status of the matrices is illustrated in FIG. 14. Positions 1, 4, 5, 6 and 7 are clearly not available, whereas all sources are available. Again, these positions are conveniently lumped in the top 5 rows but this is generally not the case. The flow continues past operation 903 without reduction, past operation 904 without a single assignment, to operation 908 for a multiple assignment with q=5. Considering a maximum of $q_{max}$=4, one column must be dropped. The column sums lead to the conclusion that sources 2, 3, 4 and 5 shall be considered for the multiple assignment, dropping source 1. The winning assignment is "9/8/3/10", that is source 2 is assigned to position 9, source 3 is assigned to position 8, source 4 is assigned to position 3 and source 5 is assigned to position 10. And in the final iteration of the flow, the remaining single assignment is trivial: source 1 to position 2. The flow ends at condition 906.

A person skilled in the art can now compose a software subroutine that automatically places a substantial amount of images from a library in a mosaic. A person skilled in the art can now compose a software subroutine that automatically places all images from a library in a mosaic, as long as there are at least as many regions as there are images.

The benefit of the present method for assigning tile images to tile regions in the composition phase of the mosaic generation are now apparent. Not only is it possible to ensure the assignment of a substantial number of mandatory raw source images to the mosaic, it is possible to resolve the cases in which multiple candidate tile images most prefer to be located at a same tile region. A further benefit is that the underlying subject matter of the raw source images is considered which leads to a more effective placement of subject matters, since now it is possible to generate multiple renditions of multiple raw source images covering a single subject matter. A further benefit is that a more evenly distributed frequency of appearance of subject matters may be accomplished, a distribution that closely approaches a uniform distribution. Whereas in prior art the over-usage of an individual tile image is controlled by limiting repeat occurrences of tile images in the mosaic irrespective of the general suitability of the tile image, the present method finds the best tile region for each individual subject matter until all subject matters are depleted, and repeats with replenished subject matters until all tile regions are assigned.

The above method for placement of images from a library in a mosaic is the preferred method. Other methods may accomplish the same purpose, and some of those methods may require fewer steps. An alternate method involves the selection of the library images one by one (possibly in a random order) and placing a processed version of the image at the best tile location. This lies within the scope of the present invention. It is accomplished as follows with random ordering of the sequence in which the source images are processed. A "used"/"unused" flag for each individual source image aids in the selection ensuring that all source images occur at least once. The steps are:

1. Reset (set to a value of zero) the selection flag for each individual source tile image in the library
2. Randomly select a source tile image from the library, and set (set to a value of one, mark as "used") its selection flag, thus marking that the selected source image has been selected in the present iteration through the library. In this step, select only from the set of "unused" source images that have their flag value at zero.
3. Locate in the disparity matrix the row that corresponds to the selected source image
4. Locate in that column the lowest figure of visual difference from the figures of visual difference that correspond to available tile locations. The corresponding column number designates the best tile location for the current source image.
5. Select that best location as the tile location for insertion of the current source image in the mosaic. Mark that location such that it is no longer available for insertion.
6. Insert the source tile movie in the mosaic at the location of the tile region, and apply the winning cropping and the winning brightness and contrast adjustment. Apply any post placement adjustments, such as further colour, brightness and contrast adjustments to the source image.
7. Repeat steps 2 to 6 for all source images in the library. Stop when all tile locations have been assigned a source image.
8. Repeat steps 1 to 7 until all tile locations have been assigned a source image.

It suffices to use a personal computer with an Intel type processor with a clock speed of 800 MHz for all GUI and image processing software routines of the present invention, including the search routine and the mosaic rendering. The presented methods are thus suitable for home use and small business use.

It should be clear that within the scope of the present invention other techniques may be applied to assign tile regions to source images. These other techniques may include a preselection of tile regions based on the average color or brightness of the tile regions, thus for instance limiting the search for a region to only regions that have the approximate average colour and brightness of the rendered images pertaining to a subject matter. It should also be clear that the present invention is not limited to small libraries of source images, and that for the present invention the number of source images may exceed the number of tile regions.

It should also be clear that within the scope of the present invention assignments may be made individually or jointly with other source images. It should also be clear that within the scope of the present invention assignments may be made for source images, based on the subject matter of the source images, based on the source image itself, and/or based on a single or multiple rendition of the source images. It should also be clear that within the scope of the present invention source images may be obtained from motion pictures (video clips, home movies, other recordings), that a movie segment may be labelled with a subject matter, and that a suitable frame from the sequence may be selected based on a tile region, in which case in general a different best matching frame is selected depending on the tile region for which the movie is considered.

In the preferred embodiment of the present invention, the final version of the mosaic image is composed with the high resolution version of the selected tile images, and the mosaic is printed with high resolution on high quality photographic paper (for instance with a print resolution of 400 dots per inch for a mosaic of 30 cm by 30 cm comprised of tile images of size 1 cm by 1 cm), in order to obtain a hard copy whereby sufficient details of the subject matter in the tile images are recognizable by the viewer. It should be clear that within the scope of the present invention other processes may be used to obtain a hard copy, such as a laser print process, an ink-jet print process, a paint depositing process, other paint, ink or particle depositing processes, and other hard copy technologies.

It should be clear that within the scope of the present invention other materials may be used on which to display the mosaic, for instance textile, plastics, glass, and wall surfaces. Also, other materials may be used with which to display the mosaic, for instance coloured paints, coloured particles or coloured objects. It should be clear that within the scope of the present invention the mosaic may be displayed on a single computer monitor or video monitor, or an array of computer monitors or video monitors, or that it may be projected on one or several screens by means of one or several projectors, and that this may involve cathode ray tube technologies, liquid crystal display technologies, plasma display technologies or other optical display technologies including projection technologies.

It should be clear that within the scope of the present invention several technologies may be used with which to store the mosaic, such as optical discs (e.g. Compact Disk technology, Digital Video Disc technology), magnetic discs (e.g. Hard Drive technology, Floppy Disc technology, Storage Tape technology) or other digital or analog technologies (e.g. slide film, negative film) suitable for the storage of images.

Having described the preferred embodiment of the invention, other embodiments which incorporate concepts of the invention will now become apparent to one of skill in the art. Therefore, the invention should not be viewed as limited to the disclosed embodiments but rather should be viewed as limited only by the spirit and scope of the appended claims.

I claim:

1. A method of generating a mosaic representation of a target image, the mosaic representation incorporating a plurality of source images, the method comprising the steps of:
   a) loading the target image into a computer;
   b) generating a database having a library of source images;
   c) dividing the target image into multiple tile regions;
   d) selecting a source image from the library;
   e) comparing the selected source image with each of the tile regions, wherein the comparing comprises calculating figures of visual difference between the selected source image and the tile regions using a processor;
   e) comparing the selected source image with each of the tile regions, wherein the comparing comprises calculating figures of visual difference between the selected source image and the tile regions using a processor;
   f) selecting a tile region with a high measurement of visual similarity based on the figures of visual difference to place the selected source image;
   g) positioning the selected source image in the mosaic at the selected tile region; and
   h) repeating steps d) to g) until the mosaic representation is complete.

2. The method according to claim 1 wherein a single source image is selected from the library and wherein a single tile region is located having the highest visual similarity.

3. The method according to claim 1 wherein multiple source images are selected from the library and wherein for each of the source images a tile region is located having a high visual similarity.

4. The method according to claim 1 wherein the source images are subjected to digital image processing to increase the visual similarity.

5. The method according to claim 4 wherein the digital image processing is applied after a region has been located for the source image.

6. The method according to claim 4 wherein the digital image processing is applied before a region has been located for the source image.

7. The method according to claim 4 wherein the digital image processing includes a cropping stage.

8. The method according to claim 4 wherein the digital image processing includes adjustment of brightness and/or contrast.

9. The method according to claim 4 wherein the digital image processing includes adjustment of colour.

10. The method according to claim 4 wherein parameter ranges of the digital imaging processing are determined individually for each source image.

11. The method according to claim 4 wherein parameter ranges of the digital imaging processing are set jointly for multiple source images.

12. The method according to claim 1, with the additional step of producing multiple versions of a source image for use in generating a mosaic representation of a master image, the mosaic representation incorporating a plurality of source images by using the versions of the source images, each of the versions being produced by applying one or more digital image processing schemes to the source image.

13. The method according to claim 12 wherein generating the mosaic comprises of a) selecting a tile region of the master image b) comparing the multiple versions of the source image with the tile region; c) searching through the multiple versions to select a candidate version having a high visual similarity with the tile region; d) using the selected version in replacement of the source image in the mosaic image representation.

14. The method according to claim 12 wherein the digital image processing schemes comprise of a cropping stage.

15. The method according to claim 12 wherein the digital image processing schemes comprise of an adjustment of brightness and/or contrast.

16. The method according to claim 12 wherein the digital image processing schemes comprise of an adjustment of color.

17. The method according to claim 12, wherein the digital image processing schemes are applied before a region has been located for the source image.

18. The method according to claim 12, wherein the digital image processing schemes are applied after a region has been located for the source image.

19. The method according to claim 12 wherein parameter ranges of the digital imaging processing are set individually for each source image.

20. The method according to claim 12 wherein parameter ranges of the digital imaging processing are set jointly for all source images.

21. The method according to claim 1 with the additional step of generating a subject matter index for source images used in a mosaic representation of a master image, the source images being positioned in tile regions of the mosaic representation based on visual similarity compared with corresponding regions of the master image, the method comprising the steps of: a) dividing the master image into multiple tile regions; b) assigning a co-ordinate to the location of each tile region; c) providing a title for the subject matter or each source image; and d) preparing a list of co-ordinates for each title.

22. A method for generating a mosaic representation of a target image, the mosaic representation incorporating a plurality of source images, the method comprising the steps of:
   a) loading the target image into a computer;
   b) generating a database having a library of source images;
   c) dividing the target image into multiple generally complex tile regions;
   d) selecting a tile region of the target image;
   e) selecting one or more source images from the library;
   f) for each of the selected one or more source images, producing multiple versions of the source image by applying one or more digital image processing schemes to the source image, each of the versions being generally of a same size and generally of a different appearance;
   g) comparing each of the multiple versions of the source image with for the selected tile region, wherein the comparing comprises calculating figures of visual difference between the multiple versions of the source image and the selected tile region using a processor;
   h) for the selected tile region, selecting a version from the multiple versions of the source image, that has a high measurement of visual similarity based on the figures of visual difference;

i) positioning the selected version with the high measurement of visual similarity in the mosaic at the selected tile region;

j) repeating steps e) to i) for all the tile regions.

23. The method according to claim 22 wherein the different appearance is attained by a cropping stage in the digital image processing schemes.

24. The method according to claim 22 wherein the different appearance is attained by adjustment of brightness and/or contrast in the digital image processing schemes.

25. The method according to claim 22 wherein the different appearance is attained by adjustment of color in the digital image processing schemes.

26. The method according to claim 22, wherein the digital image processing schemes are applied before a region has been located for the source image.

27. The method according to claim 22, wherein the digital image processing schemes are applied after a region has been located for the source image.

28. The method according to claim 22 wherein parameter ranges or the digital image processing are set individually for each source image.

29. The method according to claim 22 wherein parameter ranges of the digital image processing are set jointly for all source images.

* * * * *